US012647978B2

(12) United States Patent
Wang et al.

(10) Patent No.: US 12,647,978 B2
(45) Date of Patent: Jun. 2, 2026

(54) METHOD, DEVICE, AND COMPUTER STORAGE MEDIUM OF COMMUNICATION FOR MULTIPLE PDSCH SCHEDULING AND HARQ FEEDBACK FOR MULTIPLE GROUPS IN COMMUNICATION SYSTEM

(71) Applicant: NEC CORPORATION, Tokyo (JP)

(72) Inventors: Gang Wang, Beijing (CN); Lin Liang, Beijing (CN)

(73) Assignee: NEC CORPORATION, Tokyo (JP)

( * ) Notice: Subject to any disclaimer, the term of this patent is extended or adjusted under 35 U.S.C. 154(b) by 441 days.

(21) Appl. No.: 18/038,927

(22) PCT Filed: Nov. 27, 2020

(86) PCT No.: PCT/CN2020/132360
§ 371 (c)(1),
(2) Date: May 25, 2023

(87) PCT Pub. No.: WO2022/110047
PCT Pub. Date: Jun. 2, 2022

(65) Prior Publication Data
US 2024/0023098 A1     Jan. 18, 2024

(51) Int. Cl.
H04W 72/1273     (2023.01)
H04L 1/1822     (2023.01)
H04W 72/232     (2023.01)

(52) U.S. Cl.
CPC ....... H04W 72/1273 (2013.01); H04L 1/1822 (2013.01); H04W 72/232 (2023.01)

(58) Field of Classification Search
CPC ........... H04W 72/1273; H04W 72/232; H04W 72/23; H04W 72/53; H04L 1/1822; H04L 1/1887; H04L 5/14
See application file for complete search history.

(56) References Cited

U.S. PATENT DOCUMENTS

2019/0045533 A1* 2/2019 Chatterjee ................. H04L 5/14
2021/0227564 A1* 7/2021 Khoshnevisan ...... H04W 72/53

FOREIGN PATENT DOCUMENTS

CN       111818646 A     10/2020
WO     2020191215 A1     9/2020
(Continued)

OTHER PUBLICATIONS

"HARQ scheduling and feedback for NR-U", Nokia, Nokia Shanghai Bell, 3GPP TSG RAN WG1 Ad-Hoc Meeting #97, R1-1906644, May 13-18, 2019, 14 pages.
(Continued)

*Primary Examiner* — Kiet Tang
(74) *Attorney, Agent, or Firm* — Sughrue Mion, PLLC

(57) ABSTRACT

Embodiments of the present disclosure relate to methods, devices and computer readable media for communication. A network device generates downlink control information scheduling multiple data channels grouped into a plurality of groups, and transmits the downlink control information to a terminal device. Upon receipt of the downlink control information, the terminal device performs data transmission between the terminal device and the network device based on the grouped data channels. In this way, a payload of the downlink control information can be reduced and false detection rate can also be reduced.

6 Claims, 13 Drawing Sheets

500

(56) References Cited

FOREIGN PATENT DOCUMENTS

| WO | 2020216731 A2 | 10/2020 |
| WO | 2020220359 A1 | 11/2020 |
| WO | 2020221047 A1 | 11/2020 |
| WO | 2020235884 A1 | 11/2020 |

OTHER PUBLICATIONS

"Enhancements to HARQ for NR-U operation", MediaTek Inc., 3GPP TSG RAN WG1 #97, R1-1906545, May 13-17, 2019, 11 pages.

International Search Report for PCT/CN2020/132360 dated Aug. 26, 2021.

Written Opinion for PCT/CN2020/132360 dated Aug. 26, 2021.

Extended European Search Report for EP Application No. 20962937. 7, dated on Jan. 29, 2024.

Nokia et al., "On UCI Enhancements for NR URLLC", 3GPP TSG RAN WG1#96bis R1-1904828, Apr. 3, 2019, p. 1-p. 11.

Fujitsu, "Consideration on required changes to NR using existing NR waveform", 3GPP TSG RAN WG1#103-e R1-2007785, Nov. 1, 2020, p. 1-p. 3.

JP Office Action for JP Application No. 2023-532366, mailed on Feb. 4, 2025 with English Translation.

Panasonic, "HARQ enhancement for NR-U", 3GPP TSG RAN WG1 #98b R1-1910840, Oct. 7, 2019, pp. 1-10.

Vivo, "Discussion on enhancement on PDCCH, PUCCH, PUSCH in MTRP scenario", 3GPP TSG RAN WG1 #102-e R1-2005364, Aug. 8, 2020.

Qualcomm Incorporated, "Summary of NR-U agreements till RAN1 #99", 3GPP TSG RAN WG1 #99 R1-1913599, Jan. 8, 2020.

Ericsson, "On HARQ Management", 3GPP TSG RAN WG1 #90b R1-1718645, Oct. 3, 2017.

* cited by examiner

100

120

110

200

300

301

500

600

700

1300 time

1600

1610

RECEIVE, AT A TERMINAL DEVICE AND FROM A NETWORK DEVICE, DOWNLINK CONTROL INFORMATION SCHEDULING MULTIPLE DATA CHANNELS GROUPED INTO A PLURALITY OF GROUPS

1620

PERFORM DATA TRANSMISSION BETWEEN THE TERMINAL DEVICE AND THE NETWORK DEVICE BASED ON THE GROUPED DATA CHANNELS

1700

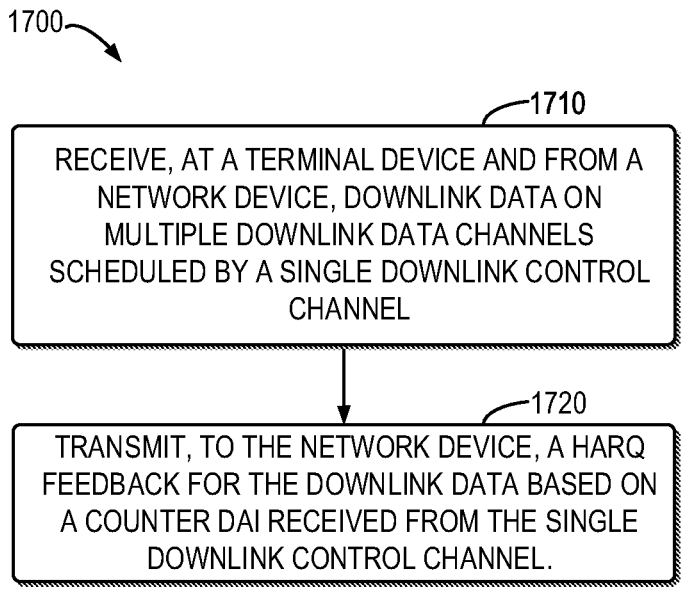

1710

RECEIVE, AT A TERMINAL DEVICE AND FROM A NETWORK DEVICE, DOWNLINK DATA ON MULTIPLE DOWNLINK DATA CHANNELS SCHEDULED BY A SINGLE DOWNLINK CONTROL CHANNEL

1720

TRANSMIT, TO THE NETWORK DEVICE, A HARQ FEEDBACK FOR THE DOWNLINK DATA BASED ON A COUNTER DAI RECEIVED FROM THE SINGLE DOWNLINK CONTROL CHANNEL.

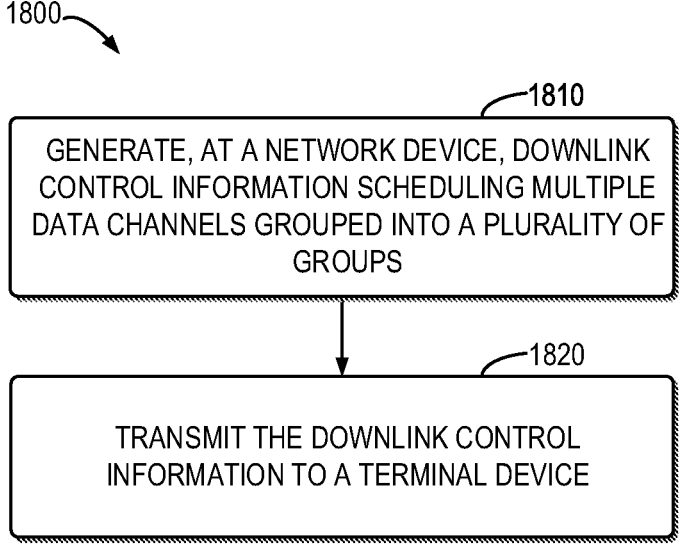

1810

GENERATE, AT A NETWORK DEVICE, DOWNLINK CONTROL INFORMATION SCHEDULING MULTIPLE DATA CHANNELS GROUPED INTO A PLURALITY OF GROUPS

1820

TRANSMIT THE DOWNLINK CONTROL INFORMATION TO A TERMINAL DEVICE

TRANSMIT, AT A NETWORK DEVICE AND TO A TERMINAL DEVICE, DOWNLINK DATA ON MULTIPLE DOWNLINK DATA CHANNELS SCHEDULED BY A SINGLE DOWNLINK CONTROL CHANNEL

1920

RECEIVE, FROM THE TERMINAL DEVICE, A HARQ FEEDBACK FOR THE DOWNLINK DATA BASED ON A COUNTER DAI

2000

2040     2050     2010

PROCESSOR

MEMORY     2020
                  2030
PROG

METHOD, DEVICE, AND COMPUTER STORAGE MEDIUM OF COMMUNICATION FOR MULTIPLE PDSCH SCHEDULING AND HARQ FEEDBACK FOR MULTIPLE GROUPS IN COMMUNICATION SYSTEM

CROSS REFERENCE TO RELATED APPLICATIONS

This application is a National Stage of International Application No. PCT/CN2020/132360 filed Nov. 27, 2020.

TECHNICAL FIELD

Embodiments of the present disclosure generally relate to the field of telecommunication, and in particular, to methods, devices and computer storage media of communication during scheduling of multi-transmission time interval (TTI) in one downlink control channel.

BACKGROUND

Currently, to support new radio (NR) from 52.6 GHz to 71 GHz, it is proposed to employ multi-TTI based scheduling, where one physical downlink control channel (PDCCH) is used to schedule multiple physical uplink shared channels (PUSCHs). Based on this mechanism, scheduler implementation and higher layer processing burdened can be relaxed, while maintaining same peak data rate.

If the multi-TTI based scheduling is extended to the scheduling of multiple physical downlink shared channels (PDSCHs) by DCI on a single PDCCH, more bits in DCI should be increased as there may be two transport blocks (TBs) in one PDSCH. This causes a payload of the DCI bigger and introduces higher false detection rate.

SUMMARY

In general, embodiments of the present disclosure provide methods, devices and computer storage media for communication during scheduling of multi-TTI in one downlink control channel.

In a first aspect, there is provided a method of communication. The method comprises: receiving, at a terminal device and from a network device, downlink control information scheduling multiple data channels grouped into a plurality of groups; and performing data transmission between the terminal device and the network device based on the grouped data channels.

In a second aspect, there is provided a method of communication. The method comprises: receiving, at a terminal device and from a network device, downlink data on multiple downlink data channels scheduled by a single downlink control channel; and transmitting, to the network device, a hybrid automatic repeat request (HARQ) feedback for the downlink data based on a counter downlink assignment indicator (DAI) received from the single downlink control channel.

In a third aspect, there is provided a method of communication. The method comprises: generating, at a network device, downlink control information scheduling multiple data channels grouped into a plurality of groups; and transmitting the downlink control information to a terminal device.

In a fourth aspect, there is provided a method of communication. The method comprises: transmitting, at a network device and to a terminal device, downlink data on multiple downlink data channels scheduled by a single downlink control channel; and receiving, from the terminal device, a HARQ feedback for the downlink data generated based on a counter DAI.

In a fifth aspect, there is provided a terminal device. The terminal device comprises a processor and a memory coupled to the processor. The memory stores instructions that when executed by the processor, cause the terminal device to perform the method according to the first aspect of the present disclosure.

In a sixth aspect, there is provided a terminal device. The terminal device comprises a processor and a memory coupled to the processor. The memory stores instructions that when executed by the processor, cause the terminal device to perform the method according to the second aspect of the present disclosure.

In a seventh aspect, there is provided a network device. The network device comprises a processor and a memory coupled to the processor. The memory stores instructions that when executed by the processor, cause the network device to perform the method according to the third aspect of the present disclosure.

In an eighth aspect, there is provided a network device. The network device comprises a processor and a memory coupled to the processor. The memory stores instructions that when executed by the processor, cause the network device to perform the method according to the fourth aspect of the present disclosure.

In a ninth aspect, there is provided a computer readable medium having instructions stored thereon. The instructions, when executed on at least one processor, cause the at least one processor to perform the method according to the first and second aspects of the present disclosure.

In a tenth aspect, there is provided a computer readable medium having instructions stored thereon. The instructions, when executed on at least one processor, cause the at least one processor to perform the method according to the third and fourth aspects of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 17 illustrates another example method of communication implemented at a terminal device in accordance with some embodiments of the present disclosure;

FIG. 18 illustrates an example method of communication implemented at a network device in accordance with some embodiments of the present disclosure;

Throughout the drawings, the same or similar reference numerals represent the same or similar element.

DETAILED DESCRIPTION

Figure 1:
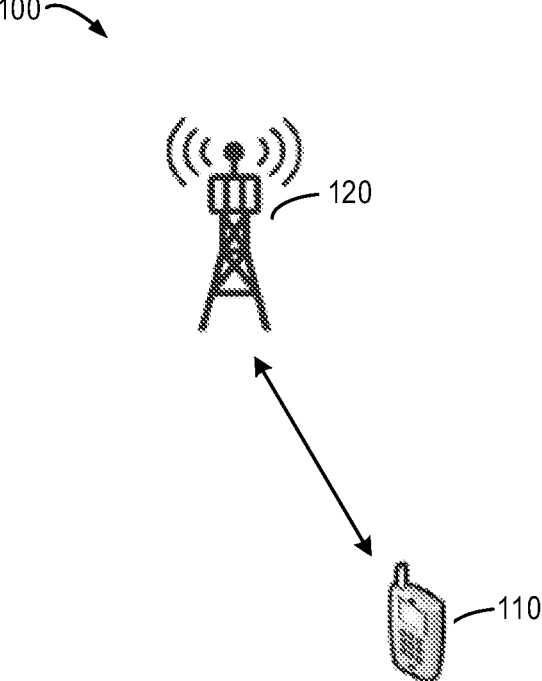
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device or the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As mentioned above, if the scheduling of multiple PUSCHs in a single DCI is extended to the scheduling of multiple PDSCHs in a single DCI, more bits in DCI are needed to be increased as there may be two TBs in one PDSCH. Specifically, DCI comprises a new data indicator (NDI) field and a redundancy version (RV) field. Bits of the NDI field and bits of the RV field are respectively one to one mapped to the scheduled PUSCHs. If it is extended to the scheduling of multiple PDSCHs in DCI and there are two TBs in one PDSCH, the bits of the NDI field and RV field will be doubled. In this case, the payload of the DCI will become bigger and thus higher false detection rate will be introduced.

In view of this, embodiments of the present disclosure provide a solution for scheduling multiple data channels by DCI on a single downlink control channel. This solution can be applied to the scheduling for uplink data channels and also can be applied to the scheduling for downlink data channels. In the solution, the multiple data channels are divided into multiple groups and each of the multiple groups is allocated with the same bit in the NDI field and RV field, i.e., shares NDI and RV values in the DCI. In this way, less bit is used to indicate new data or retransmission data for each data channel group. Thus, the payload of the DCI can be reduced and false detection rate can also be reduced.

Embodiments of the present disclosure also provide a solution for enhancing HARQ feedback for multiple downlink data channels scheduled by DCI on a single downlink control channel. In the solution, a counter DAI (also referred to as c-DAI herein) is allocated for the multiple downlink data channels scheduled by the DCI, and HARQ feedback is provided based on the counter DAI for one CC and CA. In this way, HARQ feedback enhancement can be achieved for the multiple downlink data channels scheduled by the DCI.

Principles and implementations of the present disclosure will be described in detail below with reference to the figures.

Example of Communication Network

FIG. 1 illustrates a schematic diagram of an example communication network 100 in which some embodiments of the present disclosure can be implemented. As shown in FIG. 1, the communication network 100 may include a terminal device 110 and a network device 120. In some embodiments, the terminal device 110 may be served by the network device 120. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

As shown in FIG. 1, the terminal device 110 may communicate with the network device 120 via a channel such as a wireless communication channel. The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In some embodiments, the terminal device 110 may transmit uplink data to the network device 120 via an uplink data channel transmission. For example, the uplink data channel transmission may be a PUSCH transmission. Of course, any other suitable forms are also feasible. In some embodiments, the terminal device 110 may receive downlink data from the network device 120 via a downlink data channel transmission. For example, the downlink data channel transmission may be a PDSCH transmission. Of course, any other suitable forms are also feasible.

In some embodiments, the terminal device 110 may receive DCI, e.g., data transmission configuration from the network device 120 via a downlink control channel transmission. For example, the downlink control channel transmission may be a PDCCH transmission. Of course, any other suitable forms are also feasible. In some embodiments, the terminal device 110 may transmit uplink control information (UCI), e.g., HARQ feedback information to the network device 120 via an uplink channel transmission. For example, the uplink channel transmission may be a PUCCH or PUSCH transmission. Of course, any other suitable forms are also feasible.

In some embodiments, the network device 120 may provide a plurality of serving cells (not shown herein) for the terminal device 110, for example, a primary cell (PCell), a primary secondary cell (PSCell), a secondary cell (SCell), a special cell (sPCell) or the like. Each of the serving cells may correspond to a CC. The terminal device 110 may perform transmission with the network device 120 via a CC. Of course, the terminal device 110 may perform transmission with the network device 120 via multiple CCs, for example, in case of CA.

Figure 2:
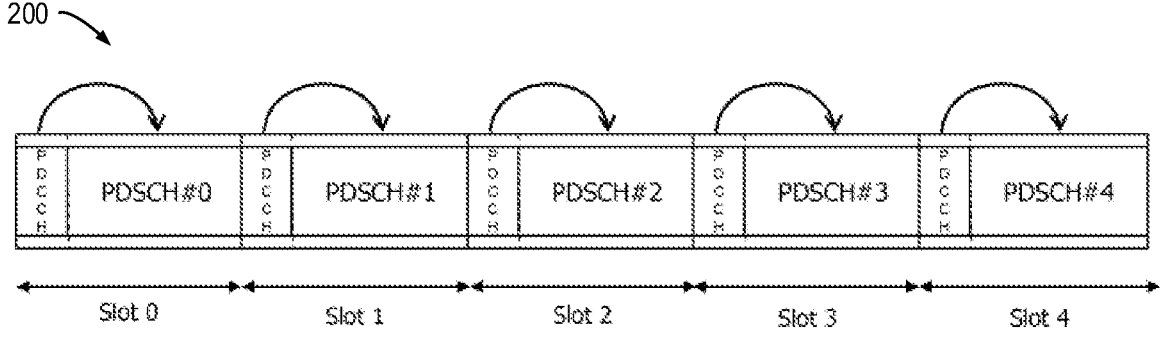
FIG. 2 illustrates a schematic diagram illustrating a process for scheduling one downlink data channel by DCI according to a conventional solution.

In a conventional solution, a network device may schedule one downlink data channel by DCI on a single downlink control channel. FIG. 2 illustrates a schematic diagram illustrating a process 200 for scheduling one downlink data channel by DCI according to a conventional solution. As shown in FIG. 2, one PDCCH schedules one PDSCH, and each PDSCH occupies a HARQ process number.

Figure 3:
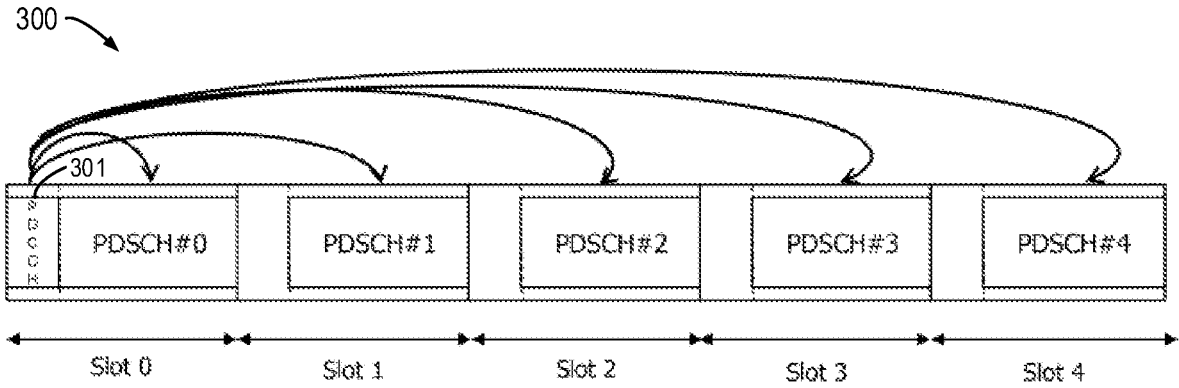
FIG. 3 illustrates a schematic diagram illustrating a process for scheduling multiple data channels by a single DCI according to embodiments of the present disclosure.

According to embodiments of the present disclosure, the network device 120 may schedule multiple downlink data channels by DCI on a single downlink control channel for the terminal device 110. FIG. 3 illustrates a schematic diagram illustrating a process 300 for scheduling multiple downlink data channels by DCI according to embodiments of the present disclosure. As shown in FIG. 3, one PDCCH 301 schedules five PDSCHs, i.e., PDSCH #0 to #4. It is to be understood that the number of PDSCHs scheduled in one PDCCH is not limited to the above example, and any other integer larger than one is also feasible. Although FIG. 3 shows one PDCCH scheduling multiple PDSCHs, embodiments of the present disclosure are also applied to one PDCCH scheduling multiple PUSCHs. For convenience, the following description is made by taking one PDCCH scheduling multiple PDSCHs as an example.

Example Implementation of Scheduling of Data Channels in DCI

Figure 4:
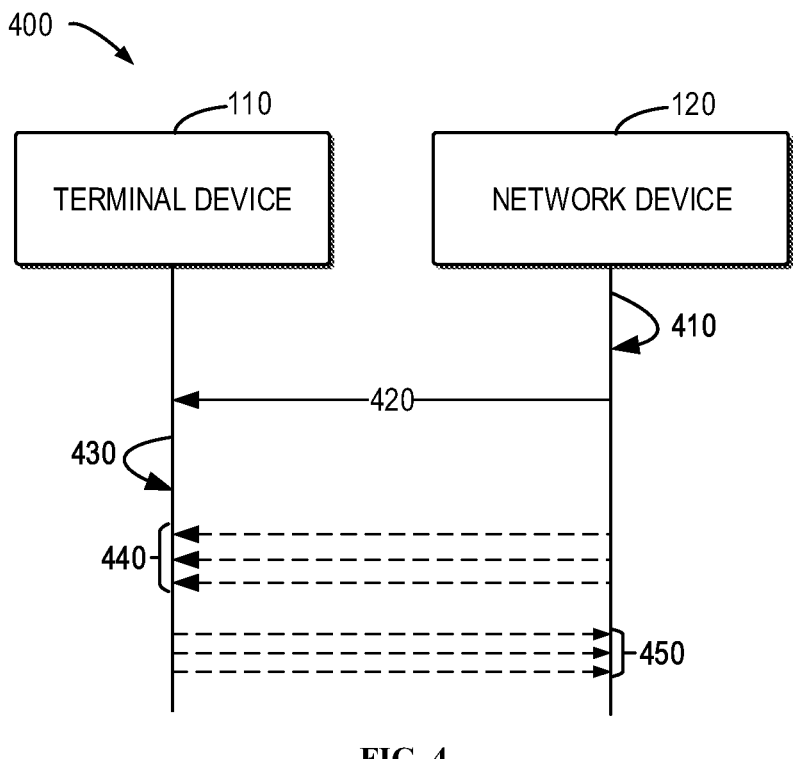
FIG. 4 illustrates a schematic diagram illustrating a process for communication upon scheduling of multiple data channels by a single DCI according to embodiments of the present disclosure.

Embodiments of the present disclosure provide a solution for scheduling multiple data channels by DCI on a single downlink control channel. This will be described in detail with reference to FIGS. 4 to 6. FIG. 4 illustrates a schematic diagram illustrating a process 400 for communication upon scheduling of multiple data channels by DCI according to embodiments of the present disclosure. For the purpose of discussion, the process 400 will be described with reference to FIG. 1. The process 400 may involve the terminal device 110 and the network device 120 as illustrated in FIG. 1.

As shown in FIG. 4, the network device 120 may generate 410 DCI for scheduling multiple data channels. In some embodiments, the DCI may comprise slot information for the multiple data channels. In some embodiments, the DCI may comprise a new data indicator (NDI) field indicating a data transmission type. In some embodiments, the DCI may further comprise a redundancy version (RV) field. Of course, the DCI may further comprise any other suitable information. For example, the DCI may further comprise modulation and coding scheme (MCS) information. As another example, the DCI may further comprise HARQ process information. In another example, the DCI may further comprise a total number of the data channels scheduled by the DCI.

According to embodiments of the present disclosure, the multiple data channels are divided into a plurality of groups, and one of bits in each of the NDI field and the RV field corresponds to one group among the plurality of groups. In other words, data channels within one group shares the same NDI and RV bits. In this way, the number of bits in DCI can be reduced significantly.

In some embodiments, data channels within one group may share a HARQ process. In some embodiments, data channels within one group may not share a HARQ process. For example, if signal quality between the terminal device 110 and the network device 120 is below a threshold quality, the network device 120 may cause each data channel in one group to occupy different HARQ processes, and if the signal quality is above the threshold quality, the network device 120 may cause data channels within one group to share a HARQ process. In some alternative or additional embodiments, the plurality of groups may share a MCS value.

In some embodiments, the network device 120 may determine the number of data channels in each group. In this way, the multiple data channels can be divided into groups. In some embodiments, the network device 120 may determine the number of data channels in each group based on the number of the bits in the NDI field and the total number of the data channels scheduled by the DCI.

In some embodiments, the network device 120 may determine the number of data channels by causing the difference in the number of data channels among the plurality of groups to be not larger than a first predetermined value. For example, the first predetermined value may be 1. Of course, any other suitable values are also feasible.

Assuming that C denotes the number of scheduled PDSCHs which is signalled by the number of indicated valid start and length indication values (SLIVs) in the row of the pdsch-TimeDomainAllocationList signalled in DCI format 1_1, and M denotes the NDI bits signalled in DCI format 1_1. In some embodiments, the number of data channels in each group may be determined by equations (1) to (3) below.

$$M_1 = \text{mod } (C, M) \tag{1}$$

$$K_1 = \left\lceil \frac{C}{M} \right\rceil \tag{2}$$

$$K_2 = \left\lfloor \frac{C}{M} \right\rfloor \tag{3}$$

If $M_1 > 0$, PDSCH group m consists of PDSCHs (TTI) with $K_1$, m=0, 1, . . . $M_1-1$; and PDSCH group m consists of PDSCHs (TTI) with $K_2$, m=$M_1$, $M_1+1$, . . . M−1. An example will be described with reference to FIG. 5.

Figure 5:
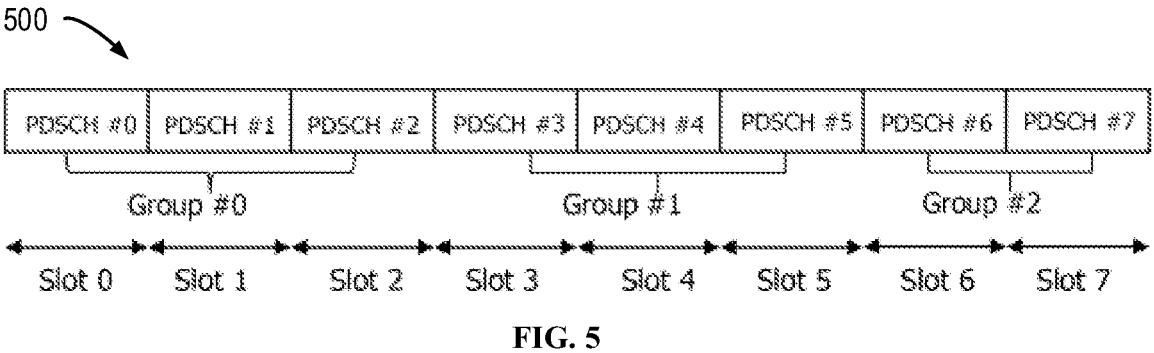
FIG. 5 illustrates a schematic diagram illustrating an example grouping of data channels scheduled by a single DCI according to embodiments of the present disclosure.

FIG. 5 illustrates a schematic diagram 500 illustrating an example grouping of data channels scheduled by DCI according to embodiments of the present disclosure. In this example, C=8, and M=3. That is, there are 8 PDSCHs scheduled by one PDCCH, as shown by PDSCH #0 to #7 in FIG. 5, and there are 3 PDSCH groups in the DCI. With the above equations (1) to (3), it is determined that PDSCH #0, PDSCH #1 and PDSCH #2 occupy Group #0, PDSCH #3, PDSCH #4 and PDSCH #5 occupy Group #1, and PDSCH #6 and PDSCH #7 occupy Group #2, as shown in FIG. 5.

In some alternative embodiments, the network device 120 may determine the number of data channels by causing the number of groups having the same number of data channels among the plurality of groups to be larger than a second predetermined value. For example, the second predetermined value may be 2. Of course, any other suitable values are also feasible. In this way, most groups among the plurality of groups are caused to have the same number of data channels.

Assuming that C denotes the number of scheduled PDSCHs which is signalled by the number of indicated valid start and length indication values (SLIVs) in the row of the pdsch-TimeDomainAllocationList signalled in DCI format 1_1, and M denotes the NDI bits signalled in DCI format 1_1. In some embodiments, the number of data channels in each group may be determined by equation (1) and equations (4) and (5) below.

$$K_1 = (C - M_1)/M \tag{4}$$

$$K_2 = K_1 + M_1 \tag{5}$$

PDSCH group m consists of PDSCHs (TTI) with $K_1$, m=0, 1, . . . M−2; and PDSCH group m consists of PDSCHs (TTI) with $K_2$, m=M−1.

Figure 6:
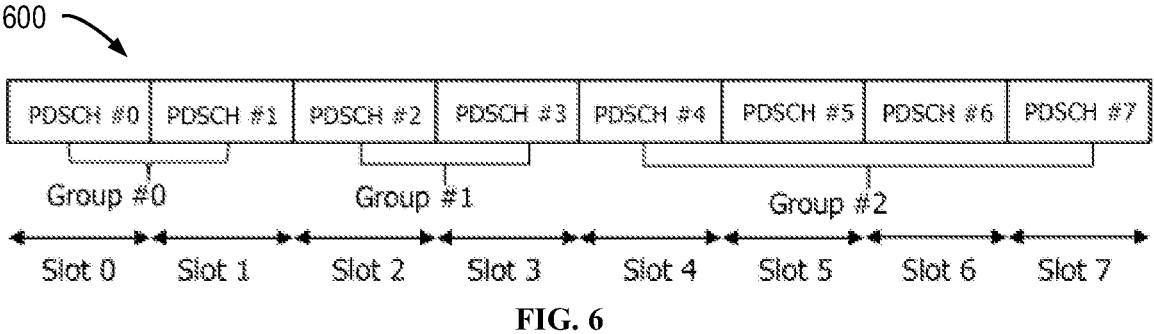
FIG. 6 illustrates a schematic diagram illustrating another example grouping of data channels scheduled by a single DCI according to embodiments of the present disclosure.

FIG. 6 illustrates a schematic diagram 600 illustrating an example grouping of data channels scheduled by DCI according to embodiments of the present disclosure. In this example, C=8, and M=3. That is, there are 8 PDSCHs scheduled by one PDCCH, as shown by PDSCH #0 to #7 in FIG. 6, and there are 3 PDSCH groups in the DCI. With the above equations (1), (4) and (5), it is determined that PDSCH #0 and PDSCH #1 occupy Group #2 and PDSCH #3 occupy Group #1, and PDSCH #4, PDSCH #5, PDSCH #6 and PDSCH #7 occupy Group #2, as shown in FIG. 6.

It is to be understood that the above equations are merely an example, and any other suitable ways are also feasible for grouping the multiple data channels.

In some alternative embodiments, the network device 120 may configure, to the terminal device 110, a higher layer signaling parameter to indicate the number of data channels in each group. In some embodiments, the network device 120 may set a flag to enable or disable a grouping or bundling of multiple data channels when the multiple data channels scheduled by DCI on a single downlink control channel is enable. For example, the flag may be configured as below.

```
PDSCH-Config ::= SEQUENCE {
...
multi-PDSCHs-Bundling-Flag BOOLEAN OPTIONAL,
...
}
```

In these embodiments, the network device 120 may introduce one additional bit in the DCI to signal the number of data channels in each group (also referred to as a group size). DCI payload may be designed as below.

DCI payload:

multi-PDSCHs-grouping support—0 or 1 bit.

1 bit if the higher layer parameter multi-PDSCHs-Bundling-Flag is true.

0 bit otherwise.

If multi-PDSCH-grouping support is 0, the network device 120 may set the group size=2, else if multi-PDSCH-grouping support is 1, the network device 120 may set the group size=4.

It is to be understood that the above values and parameters for the group size are merely an example, and any other suitable values and parameters are also feasible.

Upon determination of the number of data channels in each group, the network device 120 may assign a bit for each group to indicate whether data transmission on each data channel in this group is new data transmission. In this way, the network device 120 generates the NDI field comprising bits for the plurality of groups of data channels. Correspondingly, the network device 120 generates the RV field. In some embodiments, bits in the RV field may have the same number of bits in the NDI field. In some embodiments, bits in the RV field may have twice the number of bits in the NDI field. As a result, the network device 120 may generate the DCI comprising the NDI field and the RV field with less number of bits.

Return to FIG. 4, upon generation of the DCI, the network device 120 transmits 420 the DCI to the terminal device 110 in a single downlink control channel. In this way, the multiple data channels are scheduled by the DCI.

Upon receipt of the DCI, the terminal device 110 may determine 430 the number of data channels in each group. In other words, the terminal device 110 may determine the grouping manner employed by the network device 120.

In some embodiments, the terminal device 110 may determine the number of data channels based on the number of the bits in the NDI field and a total number of the scheduled data channels comprised in the DCI. In some embodiments, the terminal device 110 may determine the number of data channels by causing the difference in the number of data channels among the plurality of groups to be not larger than the first predetermined value. In some embodiments, the terminal device 110 may determine the number of data channels by causing the number of groups having the same number of data channels among the plurality of groups to be larger than the second predetermined value. In some alternative embodiments, the terminal device 110 may determine the number of data channels based on the higher layer signaling parameter from the network device 120.

It is to be understood that the determination of the number of data channels in each group at the terminal device 110 is the same as that performed at the network device 120, and thus other details are not repeated here for concise.

With the determination of the number of data channels in each group, the terminal device 110 determines a group of data channels to which one of the bits corresponds. That is, the terminal device 110 determines a mapping relationship between the bits of the NDI field and the plurality of groups of data channels.

In this case, the terminal device 110 can perform data transmission on the plurality of groups of data channels based on the corresponding one of the bits. In some embodiments where the scheduled data channels are multiple downlink data channels, the terminal device 110 may receive 440 downlink data on the multiple downlink data channels in corresponding slots. In some embodiments where the scheduled data channels are multiple uplink data channels, the terminal device 110 may transmit 450 uplink data on the multiple uplink data channels in corresponding slots. Although three data channels are shown by broken lines in FIG. 4, it is to be understood that this is merely an example, and the number of the multiple data channels may be an integer larger than or equal to 2.

An example comparison between the conventional solution and the present solution is made on the number of DCI bits, as shown in Table 1. In this example, assuming that there are 8 PDSCHs scheduled by DCI and at most two TBs are supported.

TABLE 1

| An example comparison on the number of DCI bits | | | |
|---|---|---|---|
| | | 8 PDSCHs scheduled by DCI with bundling (if group number is 2) | |
| Conventional DCI (only schedule one PDSCH per DCI) | 8 PDSCHs scheduled by DCI without bundling | Group size = 2 | Group size = 4 |
| DCI bits of NDI and RV fields | 2*(1 + 2) = 6 | 2*(8 + 8) = 32 | 2*(2 + 2) = 8 | 2*(4 + 4) = 16 |

The grouping of data channels may happen when a signal noise rate (SNR) is good, MCS is high and retransmission rate is low. An example relationship between MCS and PDSCH group size is given as shown in Table 2.

TABLE 2

An example relationship between MCS and PDSCH group size

| MCS | Group size |
|-----|-----------|
| 7 | 1 |
| 16 | 2 |
| 22 | 4 |

It can be seen that, with the process of FIG. 4, bundling multiple TTI can use less number of bits to indicate new data or retransmission data for each group of data channels, and limit the RV bits, when scheduling multiple data channels by DCI on a single downlink control channel. Further, jointly use NDI bits and pdsch-TimeDomainAllocationList to implicitly indicate how many TTIs in each group, it will be more flexible for the network device to schedule HARQ progress according to performance.

For these embodiments, the modification for 3GPP specification of 38.214 would be as below.

Similar as one PDCCH schedule multiple PUSCHs case in R16, When the UE is scheduled with multiple PDSCHs by a DCI, HARQ process ID indicated by this DCI applies to the first PDSCH group, HARQ process ID is then incremented by 1 for each subsequent PDSCH in the scheduled order, with modulo 16 operation applied. For any HARQ process ID(s) in a given scheduled cell, the UE is not expected to transmit a PDSCH group that overlaps in time with another PDSCH group.

If pdsch-TimeDomainAllocationList in pdsch-Config contains row indicating resource allocation for two to eight contiguous PDSCHs, K0 indicates the slot where DCI shall schedule the first PDSCH of the multiple PDSCHs. Each PDSCH has a separate SLIV and mapping type. The number of scheduled PDSCHs is signalled by the number of indicated valid SLIVs in the row of the pdsch-TimeDomainAllocationList signalled in DCI format 1_1.

When the UE is scheduled with multiple PDSCHs by a DCI, the bits of rv field and NDI field, respectively, in the DCI are one to one mapped to the scheduled PDSCH group(s) with the corresponding transport block(s) in the scheduled order where the LSB bits of the rv field and NDI field, respectively, correspond to the last scheduled PDSCH groups.

When the UE is scheduled with multiple PDSCHs by a DCI, PDSCH-to-HARQ_feedback timing indicator, which is known as K1, indicates the slot where DCI shall schedule the first PDSCH of the multiple PDSCHs, and then decremented by 1 for each subsequent PDSCH in the scheduled order, and network should guarantee the K1≥0 for the last PDSCH. All the multiple PDSCHs scheduled by a DCI will feedback HARQ in the same UL slot.

Example Implementation of HARQ Feedback in Scheduling of Data Channels

Embodiments of the present disclosure also provide a solution for enhancing HARQ feedback for multiple downlink data channels scheduled by DCI on a single downlink control channel. According to embodiments of the present disclosure, based on different interpretations for the counter DAI, embodiments of the present disclosure provide multiple solutions for HARQ feedback in scheduling of multiple downlink data channels by a single DCI. This will be described in detail with reference to FIGS. 7 to 15.

Figure 7:
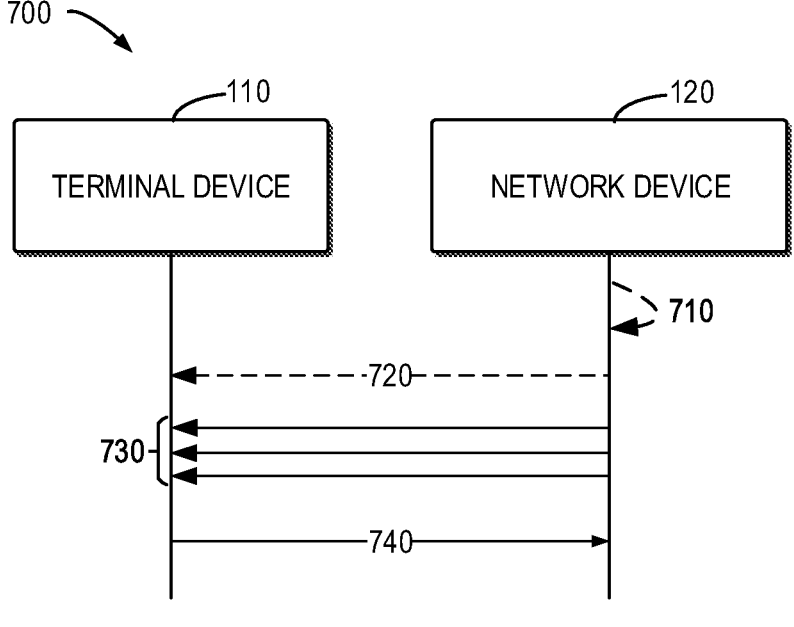
FIG. 7 illustrates a schematic diagram illustrating another process for communication upon scheduling of multiple data channels by a single DCI according to embodiments of the present disclosure.

FIG. 7 illustrates a schematic diagram illustrating another process 700 for communication upon scheduling of multiple data channels by a single DCI according to embodiments of the present disclosure. For the purpose of discussion, the process 700 will be described with reference to FIG. 1. The process 700 may involve the terminal device 110 and the network device 120 as illustrated in FIG. 1.

As shown in FIG. 7, the network device 120 may generate 710 DCI to schedule a group of downlink data channels. According to embodiments of the present disclosure, the group of downlink data channels comprises multiple downlink data channels. In some embodiments, the DCI may comprise slot information for the multiple downlink data channels. In some embodiments, the DCI may comprise a counter DAI allocated for the multiple downlink data channels. In some embodiments, the same counter DAI may be set for each downlink data channel in this group. In some embodiments, different counter DAIs may be set for each downlink data channel in this group based on the order of transmissions on the multiple downlink data channels. It is to be understood that the terminal device 110 and the network device 120 have the same interpretation for the counter DAI.

In some embodiments for CA, the DCI may further comprise a total DAI (also referred to as t-DAI here) indicating a total number of the multiple downlink data channels scheduled in a HARQ feedback window. Of course, the DCI may also comprise any other suitable information.

Upon generation of the DCI, the network device 120 may transmit 720 the DCI to the terminal device 110. Upon receipt of the DCI, the terminal device 110 may determine monitoring occasions for the multiple downlink data channels based on the slot information in the DCI. Accordingly, the terminal device 110 receives 730 downlink data transmitted from the network device 120 on the multiple downlink data channels. Although three downlink data channels are shown by broken lines in FIG. 7, it is to be understood that this is merely an example, and the number of the multiple downlink data channels may be an integer larger than or equal to 2.

Then the terminal device 110 may transmit 740 a HARQ feedback for the downlink data based on the counter DAI comprised in the DCI. According to embodiments of the present disclosure, the terminal device 110 may receive downlink data from multiple downlink data channels scheduled by a single downlink control channel on at least one serving cell in at least one monitoring occasion for a downlink control channel. In this case, HARQ feedbacks for the downlink data may be transmitted in the same uplink data or control channel. Embodiments of the present disclosure provide HARQ feedback solutions for a CC (i.e., single cell) and for CA (i.e., multiple cells). In case of a CC, the terminal device 110 may receive, on a serving cell and in at least one monitoring occasion for a downlink control channel, downlink data from multiple downlink data channels scheduled by a single downlink control channel.

1. Example Implementation of HARQ Feedback for CC

Embodiment 1

In this embodiment, the terminal device 110 may set the same counter DAI for each downlink data channel in the group of downlink data channels, and generate a HARQ codebook based on the counter DAI and the number of downlink data channels in the group of downlink data channels. This will be described in details with reference to FIGS. 8A and 8B. According to embodiments of the present disclosure, assuming that the terminal device 110 is configured with Type-2 HARQ-ACK codebook. Of course, any other suitable codebook type is also feasible.

Figure 8A:
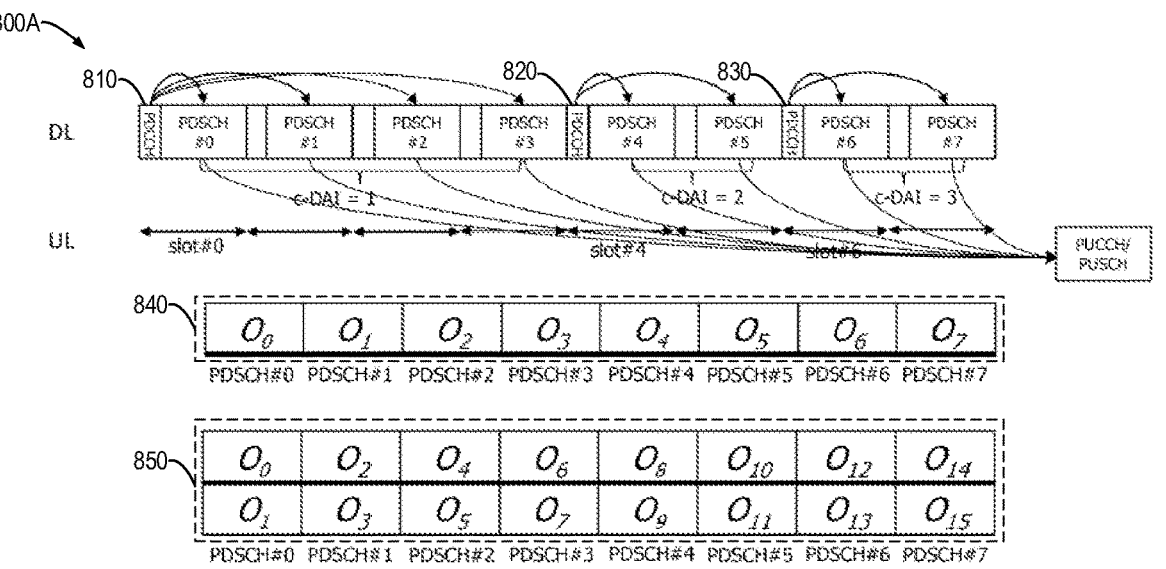
FIG. 8A illustrates a schematic diagram illustrating an example generation of HARQ feedback during scheduling of multiple data channels by a single DCI in a component carrier (CC) according to embodiments of the present disclosure.

FIG. 8A illustrates a schematic diagram 800A illustrating an example generation of HARQ feedback during scheduling of multiple data channels by DCI in a CC according to embodiments of the present disclosure. In this example, in the whole group of downlink data channels scheduled by a single DCI, counter DAIs for each downlink data channel in the whole group keep the same value as signaled in the DCI. The terminal device 110 may generate 1 or 2 HARQ bits for each downlink data channel depending on the supported TB numbers in this cell. A HARQ codebook may be generated in ascending order of the counter DAIs.

As shown in FIG. 8A, PDCCH 810 schedules four PDSCHs, i.e., PDSCH #0 to #3, and the c-DAI in PDCCH 810 of slot #0 is 1. PDCCH 820 schedules two PDSCHs, i.e., PDSCH #4 and #5, and the c-DAI in PDCCH 820 of slot #4 is 2. PDCCH 830 schedules two PDSCHs, i.e., PDSCH #6 and #7, and the c-DAI in PDCCH 830 of slot #6 is 3. Assuming that the downlink data is received correctly on PDSCH #0 to #7. In case that 1 TB is supported, a HARQ codebook 840 may be generated. In case that 2 TBs are supported, a HARQ codebook 850 may be generated.

It is to be understood that the example of FIG. 8A is merely for illustration, and does not make limitation for the present disclosure. Any other suitable ways are also feasible.

Figure 8B:
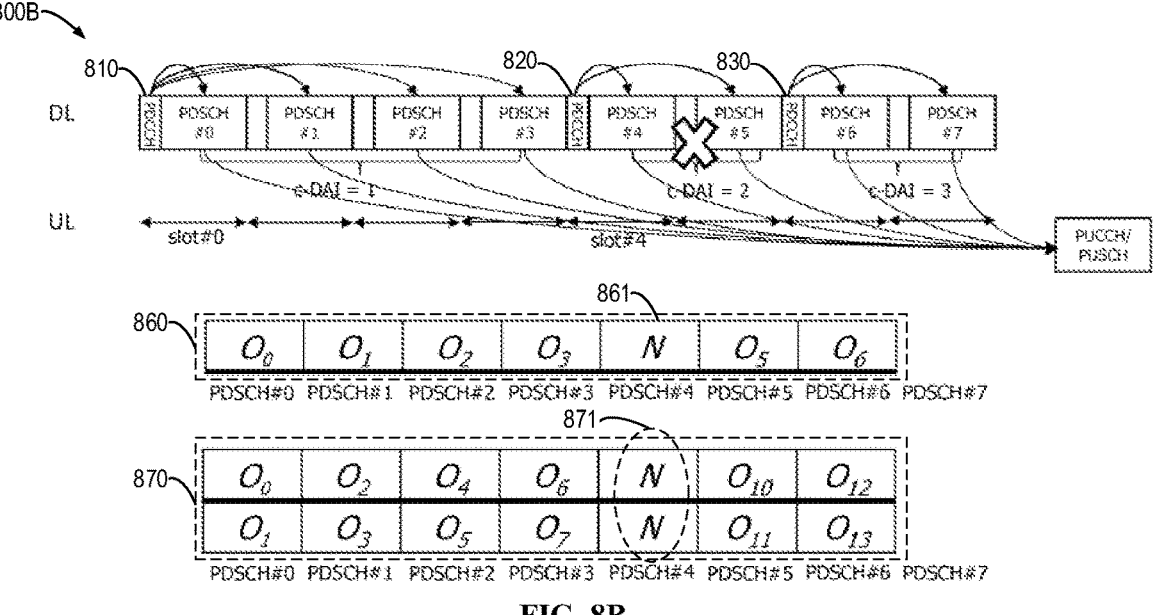
FIG. 8B illustrates a schematic diagram illustrating another example generation of HARQ feedback during scheduling of multiple data channels by a single DCI in a CC according to embodiments of the present disclosure.

In some embodiments, if determining that a counter DAI is missed in the HARQ feedback window, the terminal device 110 may generate a non-acknowledgement (NACK) feedback for the corresponding group of downlink data channels. This will be described with reference to FIG. 8B. FIG. 8B illustrates a schematic diagram 800B illustrating an example generation of HARQ feedback during scheduling of multiple data channels by DCI in a CC according to embodiments of the present disclosure. In this example, in the whole group of downlink data channels scheduled by DCI, counter DAIs for each downlink data channel in the whole group keep the same value as signaled in the DCI. The terminal device 110 may generate 1 or 2 HARQ bits for each downlink data channel depending on the supported TB numbers in this cell. A HARQ codebook may be generated in ascending order of the counter DAIs. If any DCI in PDCCHs 810-830 is missing, the terminal device 110 may generate 1 or 2 HARQ NACK bits depending on the supported TB numbers for the missing DCI.

As shown in FIG. 8B, DCI in PDCCH 820 is missing. In this case, if 1 TB is supported, the terminal device 110 may generate 1 HARQ NACK bit for the missing DCI as shown by reference sign 861, and a HARQ codebook 860 may be generated. If 2 TBs are supported, a HARQ codebook 870 may be generated with two HARQ NACK bits as shown by reference sign 871.

Embodiment 2

In this embodiment, the terminal device 110 may generate N HARQ bits for each counter DAI. Here, N denotes the maximum number of downlink data channels scheduled by DCI in the same HARQ feedback window (i.e., the same uplink data or control channel). This will be described in details with reference to FIGS. 9A and 9B.

Figure 9A:
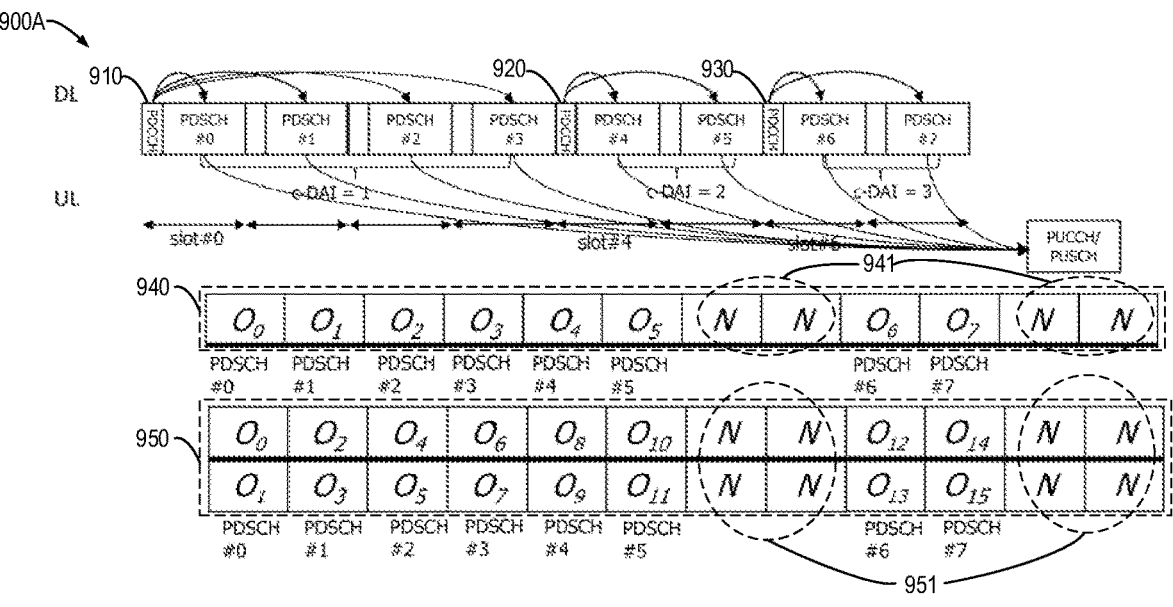
FIG. 9A illustrates a schematic diagram illustrating another example generation of HARQ feedback during scheduling of multiple data channels by a single DCI in a CC according to embodiments of the present disclosure.

FIG. 9A illustrates a schematic diagram 900A illustrating another example generation of HARQ feedback during scheduling of multiple data channels by DCI in a CC according to embodiments of the present disclosure. In this example, in the whole group of downlink data channels scheduled by a single DCI, counter DAIs for each downlink data channel in the whole group keep the same value as signaled in the DCI. The terminal device 110 may generate N HARQ bits for each counter DAI. A HARQ codebook may be generated in ascending order of the counter DAIs. If there are M downlink data channels scheduled in other DCI in the same feedback window, M<N, the terminal device 110 may pad the N HARQ bits with one or more NACK bits.

As shown in FIG. 9A, PDCCH 910 schedules four PDSCHs, i.e., PDSCH #0 to #3, and the c-DAI in PDCCH 910 of slot #0 is 1. PDCCH 920 schedules two PDSCHs, i.e., PDSCH #4 and #5, and the c-DAI in PDCCH 920 of slot #4 is 2. PDCCH 930 schedules two PDSCHs, i.e., PDSCH #6 and #7, and the c-DAI in PDCCH 930 of slot #6 is 3. Assuming that the downlink data is received correctly on PDSCH #0 to #7. In case that 1 TB is supported, a HARQ codebook 940 may be generated with HARQ NACK bits padded as shown by reference sign 941. In case that 2 TBs are supported, a HARQ codebook 950 may be generated with HARQ NACK bits padded as shown by reference sign 951.

It is to be understood that the example of FIG. 9A is merely for illustration, and does not make limitation for the present disclosure. Any other suitable ways are also feasible.

Figure 9B:
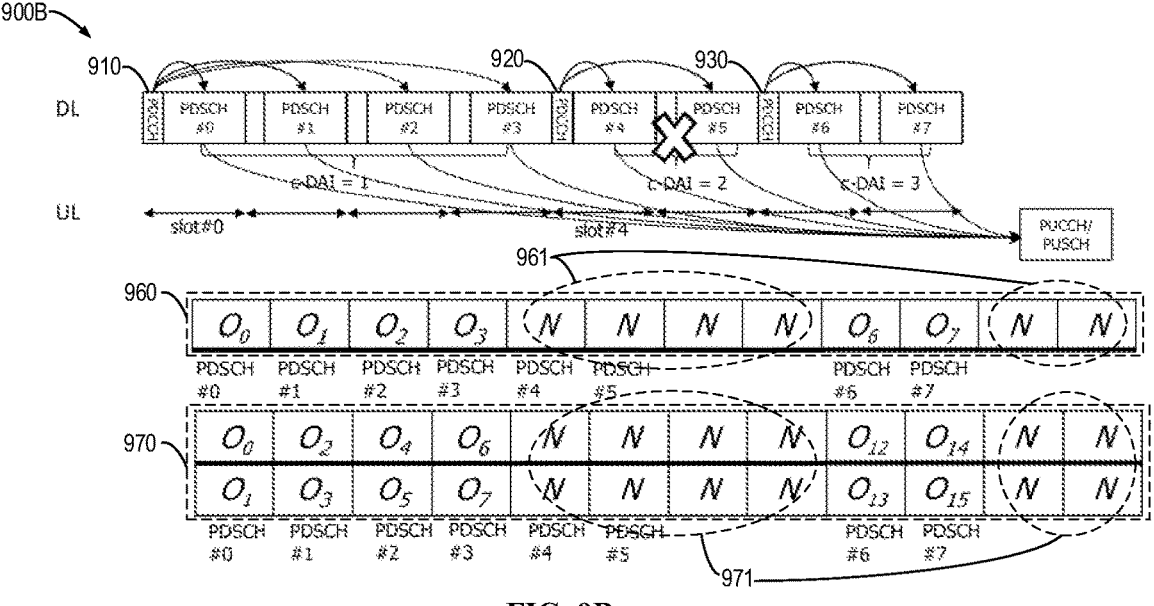
FIG. 9B illustrates a schematic diagram illustrating another example generation of HARQ feedback during scheduling of multiple data channels by a single DCI in a CC according to embodiments of the present disclosure.

In some embodiments, if determining that a counter DAI is missed, the terminal device 110 may generate N HARQ NACK bits for the corresponding group of downlink data channels. This will be described with reference to FIG. 9B. FIG. 9B illustrates a schematic diagram 900B illustrating another example generation of HARQ feedback during scheduling of multiple data channels by DCI in a CC according to embodiments of the present disclosure. In this example, in the whole group of downlink data channels scheduled by DCI, counter DAIs for each downlink data channel in the whole group keep the same value as signaled in the DCI. The terminal device 110 may generate 1 or 2 HARQ bits for each downlink data channel depending on the supported TB numbers in this cell. A HARQ codebook may be generated in ascending order of the counter DAIs. If any DCI in PDCCHs 910-930 is missing, the terminal device 110 may generate N HARQ NACK bits depending on the maximum scheduled PDSCH size in the feedback window. In this example, N=4.

As shown in FIG. 9B, DCI in PDCCH 920 is missing. In this case, if 1 TB is supported, the terminal device 110 may generate HARQ NACK bits for the missing DCI as shown by reference sign 961, and a HARQ codebook 960 may be generated. If 2 TBs are supported, a HARQ codebook 970 may be generated with HARQ NACK bits as shown by reference sign 971.

Embodiment 3

In this embodiment, the terminal device 110 may set counter DAIs for downlink data channels in the group of downlink data channels by incrementing the counter DAI by 1 for each subsequent downlink data channel in the DCI based on the order of receptions on the downlink data channels, in other words, based on indices of the downlink data channels. Thus, the terminal device 110 may generate a HARQ codebook based on the counter DAIs and the number of downlink data channels in the group of downlink data channels. This will be described in details with reference to FIGS. 10A and 10B.

Figures 10A, 10B:
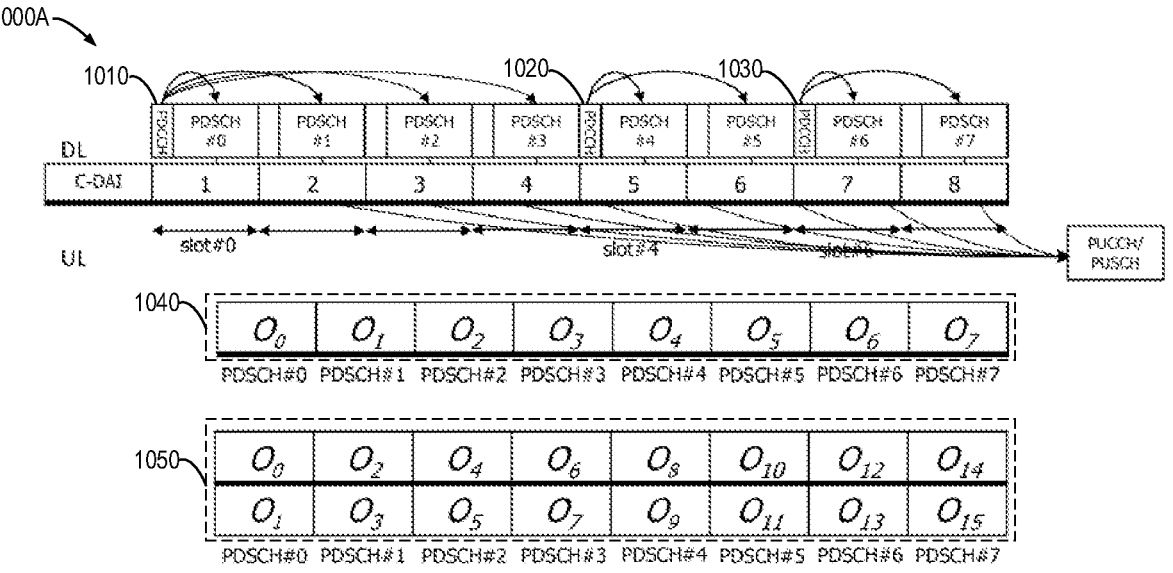
FIG. 10A illustrates a schematic diagram illustrating another example generation of HARQ feedback during scheduling of multiple data channels by a single DCI in a CC according to embodiments of the present disclosure.
FIG. 10B illustrates a schematic diagram illustrating another example generation of HARQ feedback during scheduling of multiple data channels by a single DCI in a CC according to embodiments of the present disclosure.

FIG. 10A illustrates a schematic diagram 1000A illustrating another example generation of HARQ feedback during scheduling of multiple data channels by DCI in a CC according to embodiments of the present disclosure. In this example, there is only an initial c-DAI signaled in DCI, and the initial c-DAI means the c-DAI value of the first PDSCH. In some embodiments, the c-DAI value is incremented by 1 for each subsequent PDSCH in the scheduled order, with modulo 16 operation applied. In this case, since there may be 8 PDSCHs scheduled by DCI once, the c-DAI needs to have a bit length of 4. The terminal device 110 may generate 1 or 2 HARQ bits for each PDSCH depending on the supported TB number in this cell. The HARQ codebook may be generated in ascending order of the c-DAIs.

As shown in FIG. 10A, PDCCH 1010 schedules four PDSCHs, i.e., PDSCH #0 to #3, and the c-DAI in PDCCH 1010 of slot #0 is 1. PDCCH 1020 schedules two PDSCHs, i.e., PDSCH #4 and #5, and the c-DAI in PDCCH 1020 of slot #4 is 5. PDCCH 1030 schedules two PDSCHs, i.e., PDSCH #6 and #7, and the c-DAI in PDCCH 1030 of slot #6 is 7. Assuming that the downlink data is received correctly on PDSCH #0 to #7. In case that 1 TB is supported, a HARQ codebook 1040 may be generated. In case that 2 TBs are supported, a HARQ codebook 1050 may be generated.

It is to be understood that the example of FIG. 10A is merely for illustration, and does not make limitation for the present disclosure. Any other suitable ways are also feasible.

In some embodiments, if determining that a counter DAI is missed, the terminal device 110 may generate a NACK feedback for the corresponding group of downlink data channels. This will be described with reference to FIG. 10B. FIG. 10B illustrates a schematic diagram 1000B illustrating an example generation of HARQ feedback during scheduling of multiple data channels by DCI in a CC according to embodiments of the present disclosure. In this example, there is only an initial c-DAI signaled in DCI, and the initial c-DAI means the c-DAI value of the first PDSCH. The c-DAI value of the remaining PDSCHs in the scheduling group should be incremented by 1 successively. In this case, since there may be 8 PDSCHs scheduled by DCI once, the c-DAI needs to be extended. In some embodiments, the c-DAI may have a bit length larger than 2. For example, the c-DAI may have a bit length of 3 or 4. The terminal device As shown in FIG. 10B, DCI in PDCCH 1020 is missing, and thus PDSCH #4 and PDSCH #5 are missing. In this case, if 1 TB is supported, the terminal device 110 may generate 2 HARQ NACK bits for the missing PDSCHs as shown by reference sign 1061, and a HARQ codebook 1060 may be generated. If 2 TBs are supported, a HARQ codebook 1070 may be generated with 4 HARQ NACK bits as shown by reference sign 1071.

Embodiment 4

In this embodiment, the group of downlink data channels are divided into multiple sets of downlink data channels. The terminal device 110 may generate a HARQ bit (also referred to as a crc result) for each set of downlink data channels. Within the set of downlink data channels, an "BIT AND" operation (also referred to as an AND operation herein) is performed among the HARQ bits for the sets of downlink data channels. That is, if downlink data on a downlink data channel in one set among the sets of downlink data channels is received incorrectly, the terminal device 110 may generate a NACK feedback for the one set. If downlink data on each downlink data channel in one set among the sets of downlink data channels is received correctly, the terminal device may generate an ACK feedback for the one set. In this way, the number of bits for HARQ feedback can be reduced.

Figure 11:
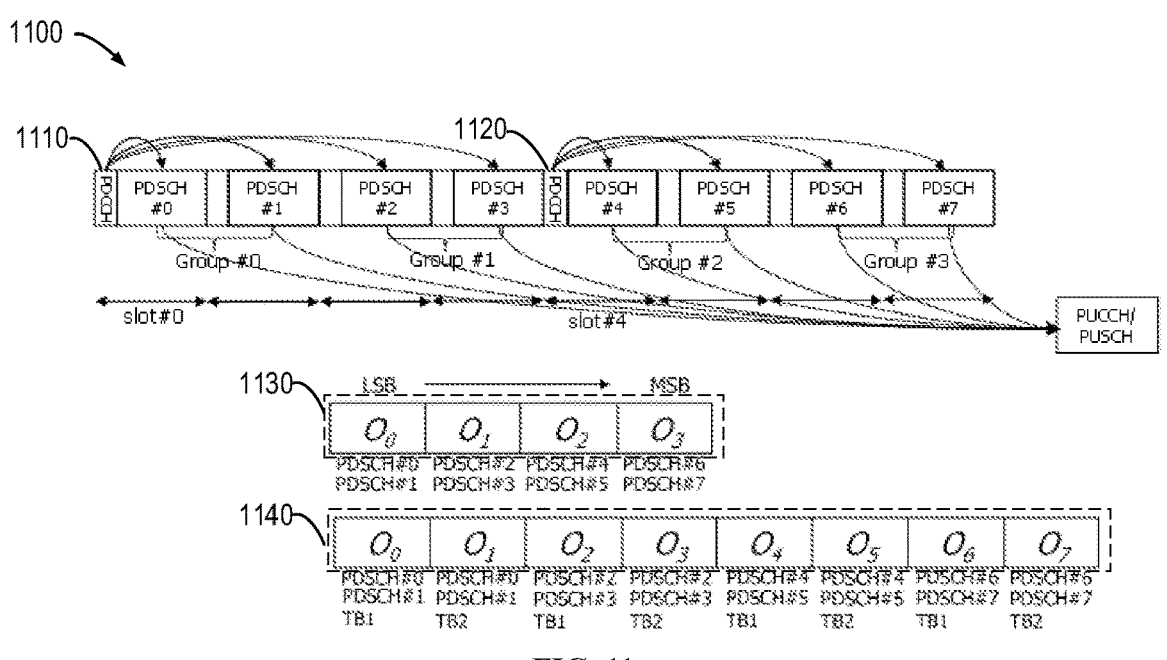
FIG. 11 illustrates a schematic diagram illustrating another example generation of HARQ feedback during scheduling of multiple data channels by a single DCI in a CC according to embodiments of the present disclosure.

FIG. 11 illustrates a schematic diagram 1100 illustrating another example generation of HARQ feedback during scheduling of multiple data channels by DCI in a CC according to embodiments of the present disclosure. In this example, the terminal device 110 may generate 1 or 2 HARQ bits depending on the supported TB number in this cell. The HARQ codebook may be generated in ascending order of c-DAIs.

As shown in FIG. 11, PDCCH 1110 schedules four PDSCHs, i.e., PDSCH #0 to #3, and the c-DAI in PDCCH 1110 of slot #0 is 1. PDCCH 1120 schedules four PDSCHs, i.e., PDSCH #4 to #7, and the c-DAI in PDCCH 1120 of slot #4 is 2. PDSCH #0 to #3 is divided into two sets, i.e., Group #0 and Group #1. PDSCH #4 to #7 is divided into two sets, i.e., Group #2 and Group #3. Group #0 and Group #1 are scheduled by PDCCH 1110 in slot #0, and Group #2 and Group #3 are scheduled by PDCCH 1120 in slot #4.

Assuming that the downlink data is received correctly on PDSCH #0 to #7. A HARQ codebook may be concluded in Table 3.

TABLE 3

| An example generation of a HARQ codebook | | | | |
|---|---|---|---|---|
| Group | | | HARQ bit | |
| ID | PDSCH group | c-DAI | 1 TB supported | 2 TB supported |
| Group 0 | PDSCH#0 PDSCH#1 | 1 | $O_0 = crc0\&crc1$ | $O_0 = crc0(TB1)\&crc1(TB1)$ $O_1 = crc0(TB2)\&crc1(TB2)$ |
| Group 1 | PDSCH#2 PDSCH#3 | 1 | $O_1 = crc2\&crc3$ | $O_2 = crc2(TB1)\&crc3(TB1)$ $O_3 = crc2(TB2)\&crc3(TB2)$ |
| Group 2 | PDSCH#4 PDSCH#5 | 2 | $O_2 = crc4\&crc5$ | $O_4 = crc4(TB1)\&crc5(TB1)$ $O_5 = crc4(TB2)\&crc5(TB2)$ |
| Group 3 | PDSCH#6 PDSCH#7 | 2 | $O_3 = crc6\&crc7$ | $O_6 = crc6(TB1)\&crc7(TB1)$ $O_7 = crc6(TB2)\&crc7(TB2)$ |

110 may generate 1 or 2 HARQ bits for each PDSCH depending on the supported TB number in this cell. The HARQ codebook may be generated in ascending order of the c-DAIs.

Where crc0 is the crc result of PDSCH #0 (only 1 TB supported); crc0 (TB1) is the crc result of TB1 (PDSCH #0), crc0 (TB2) is the crc result of TB2 (PDSCH #0) (2 TBs supported).

Accordingly, in case that 1 TB is supported, a HARQ codebook 1130 may be generated. In case that 2 TBs are supported, a HARQ codebook 1140 may be generated.

It is to be understood that the example of FIG. 11 is merely for illustration, and does not make limitation for the present disclosure. Any other suitable ways are also feasible. Although FIG. 11 is described with the same c-DAI for each PDSCH in the group, this solution of "AND" operation also can be applied with incremented c-DAIs for PDSCHs in the scheduled order.

2. Example Implementation of HARQ Feedback for CA

According to embodiments of the present disclosure, in case of CA, the terminal device 110 may receive, on multiple serving cells and in multiple monitoring occasions for downlink control channels, downlink data from multiple downlink data channels scheduled by a single downlink control channel. In this case, a HARQ codebook may be generated in order of the following: receptions on downlink data channels scheduled in a single downlink control channel; indices of serving cells; and PDCCH monitoring occasions for the downlink data channels. This will be described in details with reference to FIGS. 12 to 15.

Embodiment 5

In this embodiment, the number of downlink data channels scheduled by a single DCI in a PDCCH monitoring occasion is the same for each serving cell. The HARQ codebook may be generated first in ascending order of received multiple PDSCHs and then in ascending order of serving cell index and finally in ascending order of PDCCH monitoring occasions. This will be described in detail with reference to FIG. 12.

Figure 12:
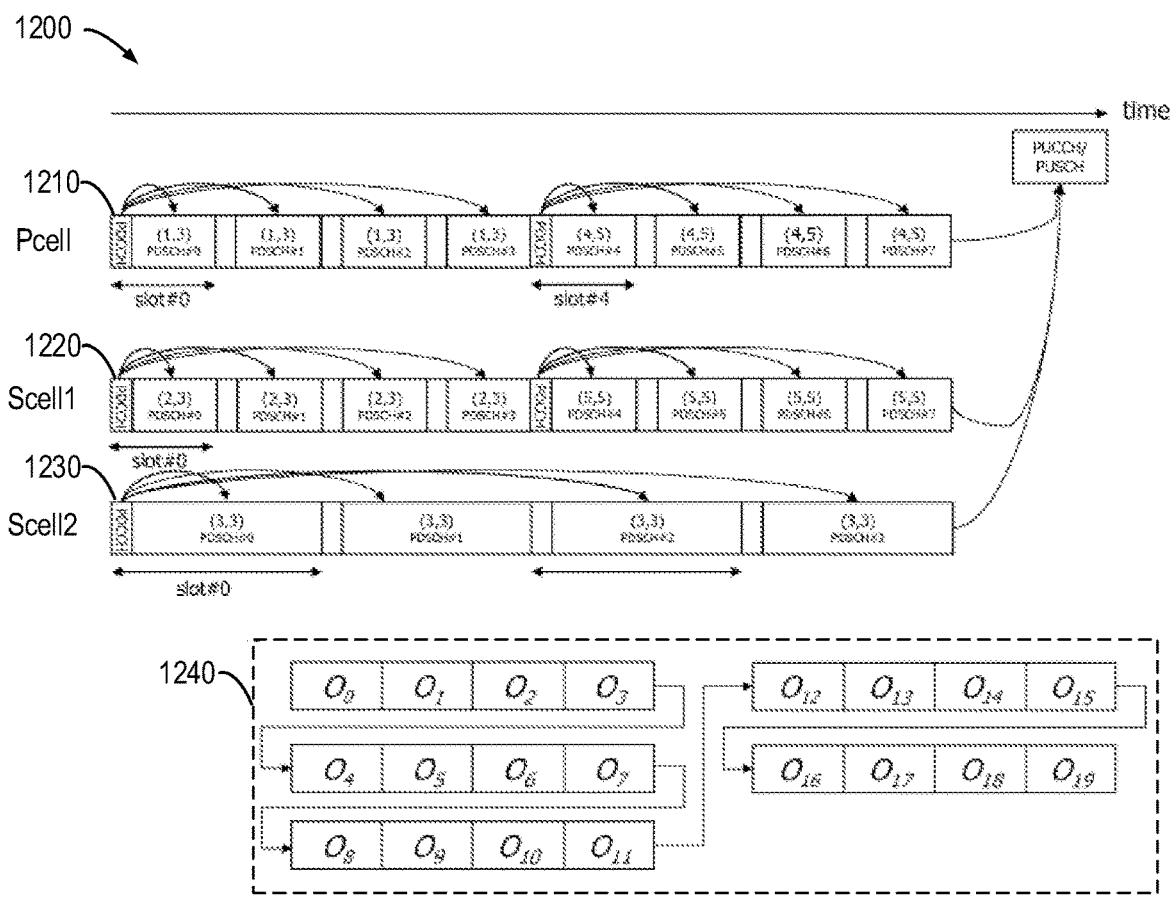
FIG. 12 illustrates a schematic diagram illustrating an example generation of HARQ feedback during scheduling of multiple data channels by a single DCI in carrier aggregation (CA) according to embodiments of the present disclosure.

FIG. 12 illustrates a schematic diagram 1200 illustrating an example generation of HARQ feedback during scheduling of multiple data channels by DCI in CA according to embodiments of the present disclosure. In this example, in the whole group of downlink data channels scheduled by DCI, c-DAIs for each downlink data channel in the whole group keep the same value as signaled in the DCI, and the t-DAI is used to judge if there is any missing detection in some PDCCH monitoring occasions. The terminal device 110 may generate 1 or 2 HARQ bits for each downlink data channel depending on the supported TB numbers in this cell.

As shown in FIG. 12, in PDCCH monitoring occasion #0, i.e., slot #0, each of PDCCH 1210 in Pcell, PDCCH 1220 in Scell1 and PDCCH 1230 in Scell2 schedules four PDSCHs. The HARQ codebook may be concluded based on Table 4.

Accordingly, in case that 1 TB is supported, a HARQ codebook 1240 may be generated. In case that 2 TBs are supported, HARQ bits number should be doubled.

It is to be understood that the example of FIG. 12 is merely for illustration, and does not make limitation for the present disclosure. Any other suitable ways are also feasible.

Embodiment 6

In this embodiment, a time interval scheduled by DCI in a monitoring occasion is the same for each serving cell. The HARQ codebook may be generated first in ascending order of received multiple PDSCHs and then in ascending order of serving cell index and finally in ascending order of PDCCH monitoring occasion. This will be described in detail with reference to FIG. 13.

Figure 13:
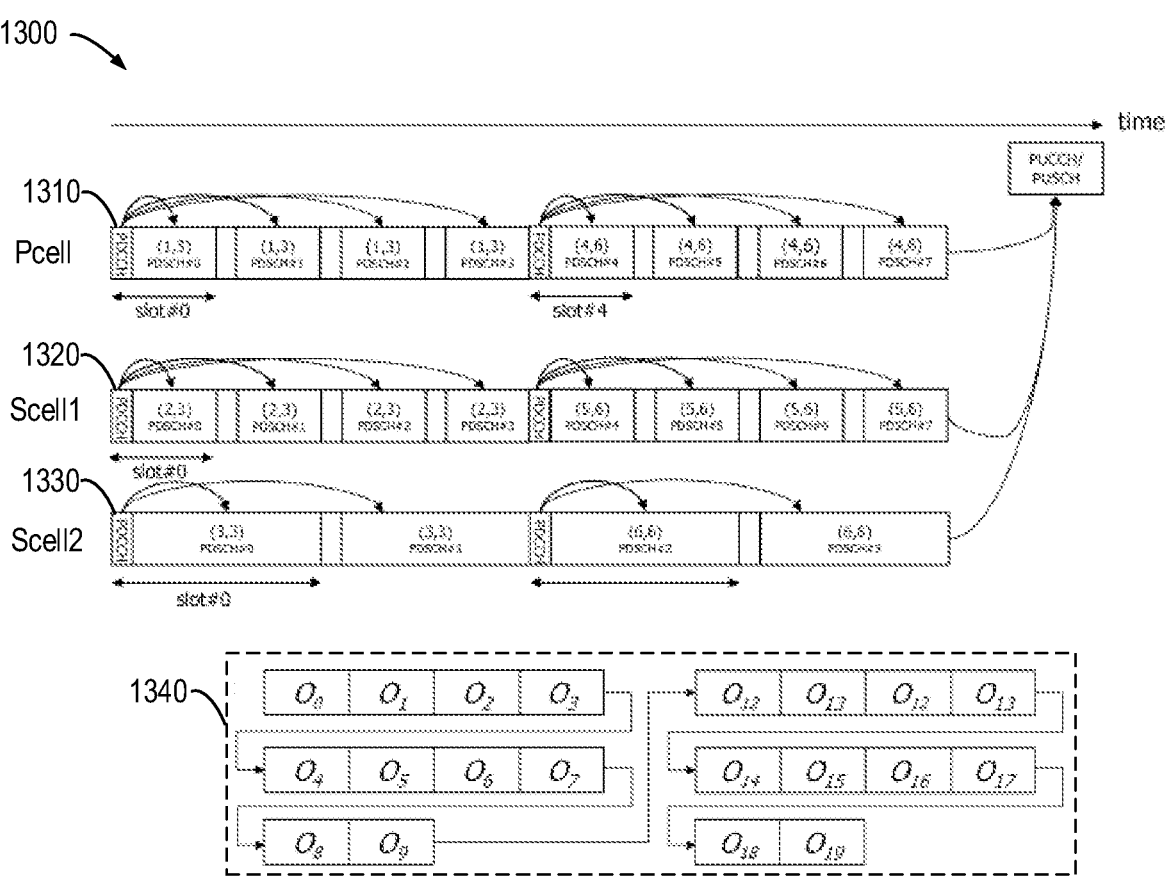
FIG. 13 illustrates a schematic diagram illustrating another example generation of HARQ feedback during scheduling of multiple data channels by a single DCI in CA according to embodiments of the present disclosure.

FIG. 13 illustrates a schematic diagram 1300 illustrating another example generation of HARQ feedback during scheduling of multiple data channels by DCI in CA according to embodiments of the present disclosure. In this example, in the whole group of downlink data channels scheduled by DCI, c-DAIs for each downlink data channel in the whole group keep the same value as signaled in the DCI, and the t-DAI is used to judge if there is any missing detection in some PDCCH monitoring occasions. The terminal device 110 may generate 1 or 2 HARQ bits for each downlink data channel depending on the supported TB numbers in this cell.

As shown in FIG. 13, in PDCCH monitoring occasion #0, i.e., slot #0, PDCCH 1310 in Pcell schedules 4 PDSCHs when a subcarrier spacing (SCS)=30 kHz, and PDCCH 1320 in Scell1 and PDCCH 1330 in Scell2 schedule 2 PDSCHs when SCS=15 kHz. The HARQ codebook may be concluded based on Table 5.

TABLE 4

| PDCCH occasion | Cell index | PDSCH group | | | | c-DAI | t-DAI |
|---|---|---|---|---|---|---|---|
| | | An example generation of the HARQ codebook | | | | | |
| 0 | Pcell | PDSCH#0 | PDSCH#1 | PDSCH#2 | PDSCH#3 | 1 | 3 |
| | Scell1 | PDSCH#0 | PDSCH#1 | PDSCH#2 | PDSCH#3 | 2 | 3 |
| | Scell2 | PDSCH#0 | PDSCH#1 | PDSCH#2 | PDSCH#3 | 3 | 3 |
| 1 | Pcell | PDSCH#4 | PDSCH#5 | PDSCH#6 | PDSCH#7 | 4 | 5 |
| | Scell1 | PDSCH#4 | PDSCH#5 | PDSCH#6 | PDSCH#7 | 5 | 5 |

TABLE 5

| PDCCH occasion | Cell index | PDSCH group | | | | c-DAI | t-DAI |
|---|---|---|---|---|---|---|---|
| | | An example generation of the HARQ codebook | | | | | |
| 0 | Pcell | PDSCH#0 | PDSCH#1 | PDSCH#2 | PDSCH#3 | 1 | 3 |
| | Scell1 | PDSCH#0 | PDSCH#1 | PDSCH#2 | PDSCH#3 | 2 | 3 |
| | Scell2 | PDSCH#0 | PDSCH#1 | | | 3 | 3 |
| 1 | Pcell | PDSCH#4 | PDSCH#5 | PDSCH#6 | PDSCH#7 | 4 | 6 |
| | Scell1 | PDSCH#4 | PDSCH#5 | PDSCH#6 | PDSCH#7 | 5 | 6 |
| | Scell2 | PDSCH#3 | PDSCH#4 | | | 6 | 6 |

Accordingly, in case that 1 TB is supported, a HARQ codebook 1340 may be generated. In case that 2 TBs are supported, HARQ bits number should be doubled.

It is to be understood that the example of FIG. 13 is merely for illustration, and does not make limitation for the present disclosure. Any other suitable ways are also feasible.

Embodiment 7

In this embodiment, the terminal device 110 may generate N HARQ bits for each c-DAI for each cell in the same PDCCH monitoring occasion. Here, N denotes the maximum number of downlink data channels scheduled by a single DCI in the same monitoring occasion. If there are M downlink data channels by DCI in other cells within the same monitoring occasion, M<N, the terminal device 110 may pad the N HARQ bits with one or more NACK bits. The HARQ codebook may be generated first in ascending order of received multiple PDSCHs and then in ascending order of serving cell index and finally in ascending order of PDCCH monitoring occasion. This will be described in detail with reference to FIG. 14.

Figure 14:
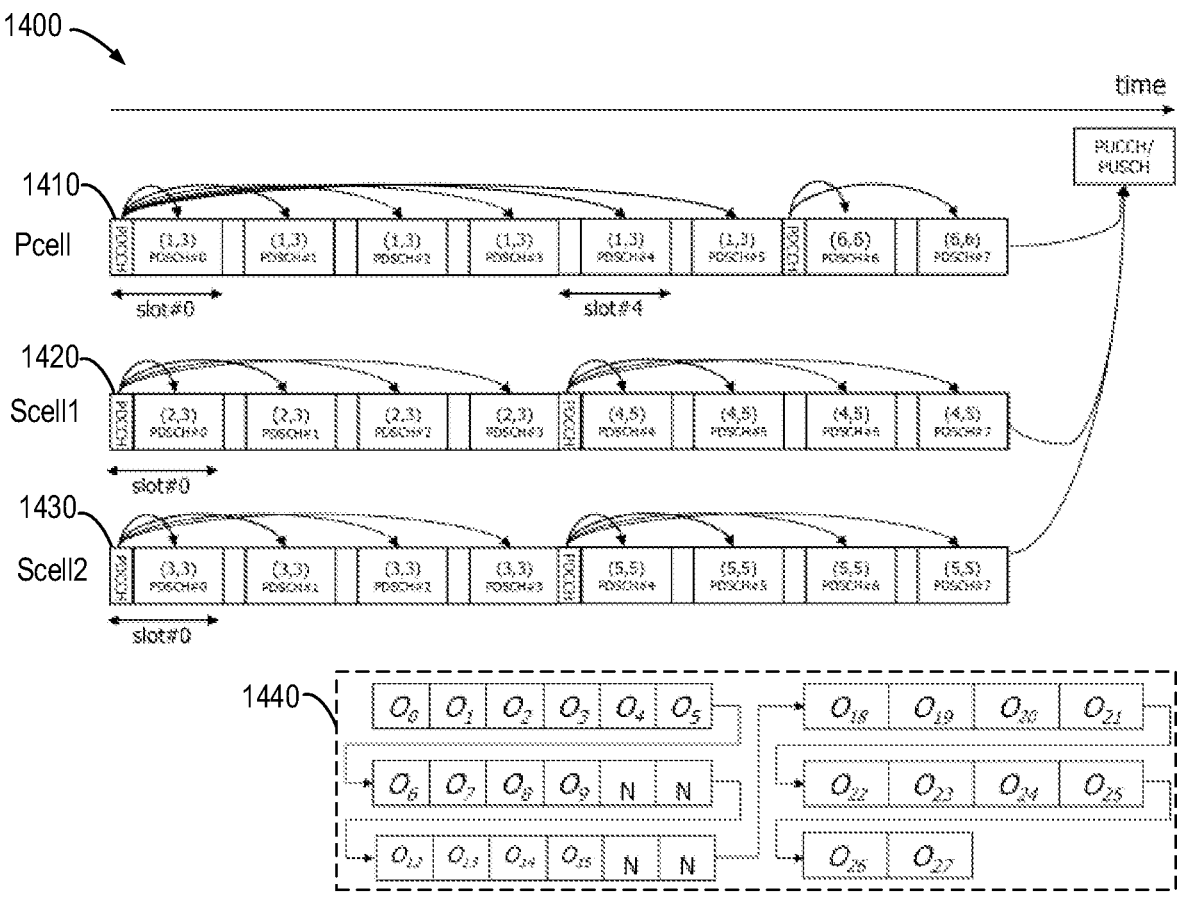
FIG. 14 illustrates a schematic diagram illustrating another example generation of HARQ feedback during scheduling of multiple data channels by a single DCI in CA according to embodiments of the present disclosure.

FIG. 14 illustrates a schematic diagram 1400 illustrating another example generation of HARQ feedback during scheduling of multiple data channels by a single DCI in CA according to embodiments of the present disclosure. In this example, in the whole group of downlink data channels scheduled by a single DCI, c-DAIs for each downlink data channel in the whole group keep the same value as signaled in the DCI, and the t-DAI is used to judge if there is any missing detection in some PDCCH monitoring occasions. The terminal device 110 may generate 1 or 2 HARQ bits for each downlink data channel depending on the supported TB numbers in this cell.

As shown in FIG. 14, in the same PDCCH monitoring occasion #0, i.e., slot #0, PDCCH 1410 in Pcell schedules 6 PDSCHs, PDCCH 1420 in Scell1 schedules 4 PDSCHs and PDCCH 1430 in Scell2 also schedules 4 PDSCHs. The HARQ codebook may be concluded based on Table 6.

Accordingly, in case that 1 TB is supported, a HARQ codebook 1440 may be generated. In case that 2 TBs are supported, HARQ bits number should be doubled.

It is to be understood that the example of FIG. 14 is merely for illustration, and does not make limitation for the present disclosure. Any other suitable ways are also feasible.

Embodiment 8

In this embodiment, the terminal device 110 may set c-DAIs for downlink data channels in the group of downlink data channels by incrementing the c-DAI by 1 for each subsequent downlink data channel in the DCI based on the order of receptions on the downlink data channels, in other words, based on indices of the downlink data channels. Thus, the terminal device 110 may generate a HARQ codebook based on the c-DAIs and the t-DAI and the number of downlink data channels in the group of downlink data channels. This will be described in details with reference to FIG. 15.

Figure 15:
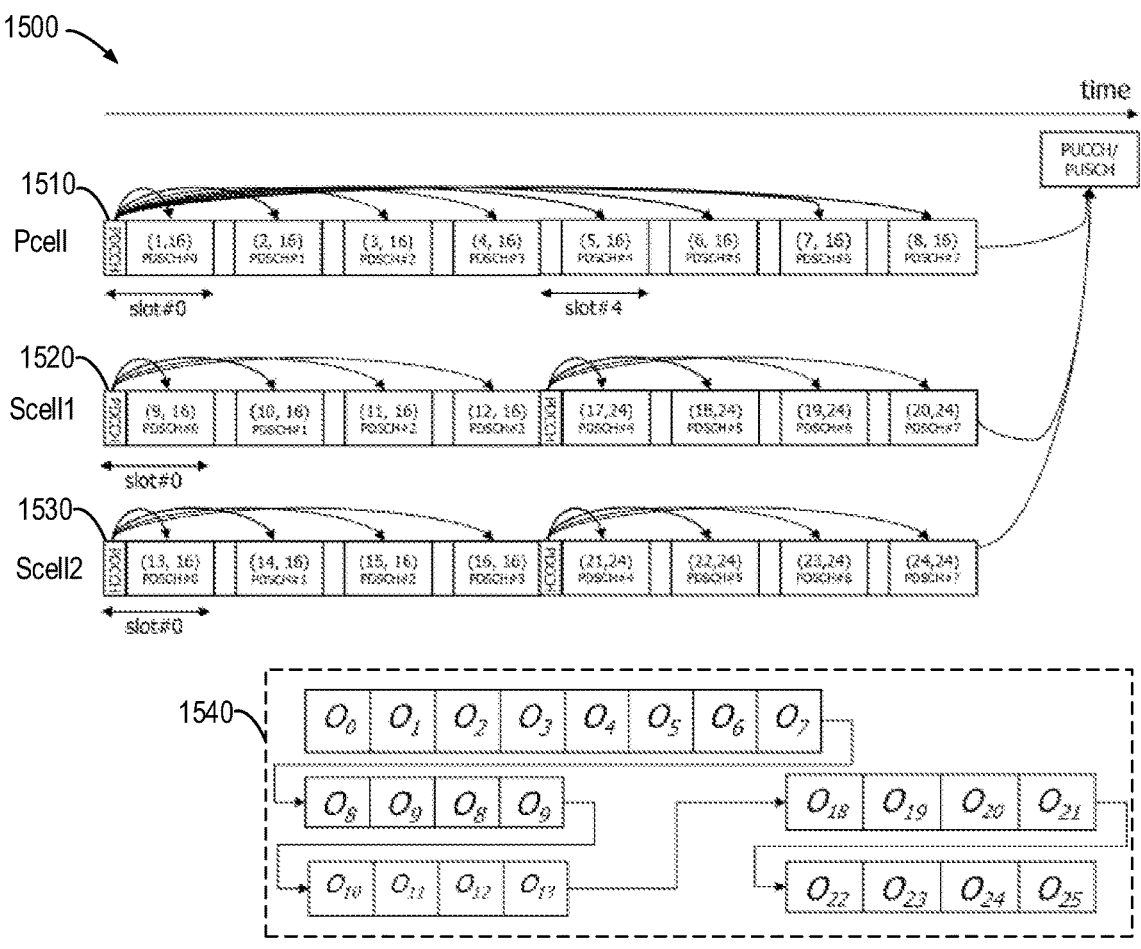
FIG. 15 illustrates a schematic diagram illustrating another example generation of HARQ feedback during scheduling of multiple data channels by a single DCI in CA according to embodiments of the present disclosure.

FIG. 15 illustrates a schematic diagram 1500 illustrating another example generation of HARQ feedback during scheduling of multiple data channels by DCI in CA according to embodiments of the present disclosure. In this example, there is only an initial c-DAI signaled in DCI, and the initial c-DAI means the c-DAI value of the first PDSCH. In some embodiments, the c-DAI value is incremented by 1 for each subsequent PDSCH in the scheduled order, with modulo 16 operation applied. In this case, since there may be 8 PDSCHs scheduled by DCI once, each of the c-DAI and the t-DAI needs to be extended. In some embodiments, each of the c-DAI and the t-DAI may have a bit length larger than 2. For example, each of the c-DAI and the t-DAI may have a bit length of 3 or 4. The HARQ codebook may be generated first in ascending order of received multiple PDSCHs and then in ascending order of serving cell index and finally in ascending order of PDCCH monitoring occasion.

TABLE 6

| PDCCH occasion | Cell index | PDSCH group | | | | | | c-DAI | t-DAI |
|---|---|---|---|---|---|---|---|---|---|
| | | An example generation of the HARQ codebook | | | | | | | |
| 0 | Pcell | PDSCH#0 | PDSCH#1 | PDSCH#2 | PDSCH#3 | PDSCH#4 | PDSCH#5 | 1 | 3 |
| | Scell1 | PDSCH#0 | PDSCH#1 | PDSCH#2 | PDSCH#3 | | | 2 | 3 |
| | Scell2 | PDSCH#0 | PDSCH#1 | PDSCH#2 | PDSCH#3 | | | 3 | 3 |
| 1 | Scell1 | PDSCH#4 | PDSCH#5 | PDSCH#6 | PDSCH#7 | | | 4 | 5 |
| | Scell2 | PDSCH#4 | PDSCH#5 | PDSCH#6 | PDSCH#7 | | | 5 | 5 |
| 2 | Pcell | PDSCH#6 | PDSCH#7 | | | | | 6 | 6 |

As shown in FIG. 15, in the same PDCCH monitoring occasion #0, i.e., slot #0, PDCCH 1510 in Pcell schedules 8 PDSCHs, PDCCH 1520 in Scell1 schedules 4 PDSCHs and PDCCH 1530 in Scell2 also schedules 4 PDSCHs. The HARQ codebook may be concluded based on Table 7.

TABLE 7

An example generation of the HARQ codebook

| PDCCH occasion | Cell index | PDSCH group | | | | | | | |
|---|---|---|---|---|---|---|---|---|---|
| 0 | Pcell | PDSCH#0 | PDSCH#1 | PDSCH#2 | PDSCH#3 | PDSCH#4 | PDSCH#5 | PDSCH#6 | PDSCH#7 |
| | Scell1 | PDSCH#0 | PDSCH#1 | PDSCH#2 | PDSCH#3 | | | | |
| | Scell2 | PDSCH#0 | PDSCH#1 | PDSCH#2 | PDSCH#3 | | | | |
| 1 | Scell1 | PDSCH#4 | PDSCH#5 | PDSCH#6 | PDSCH#7 | | | | |
| | Scell2 | PDSCH#4 | PDSCH#5 | PDSCH#6 | PDSCH#7 | | | | |

Accordingly, in case that 1 TB is supported, a HARQ codebook 1540 may be generated. In case that 2 TBs are supported, HARQ bits number should be doubled.

It is to be understood that the example of FIG. 15 is merely for illustration, and does not make limitation for the present disclosure. Any other suitable ways are also feasible.

In this way, HARQ feedback enhancement can be achieved for multiple downlink data channels scheduled by a single DCI.

Example Implementation of Methods

Accordingly, embodiments of the present disclosure provide methods of communication implemented at a terminal device and a network device. These methods will be described below with reference to FIGS. 16 to 19.

Figure 16:
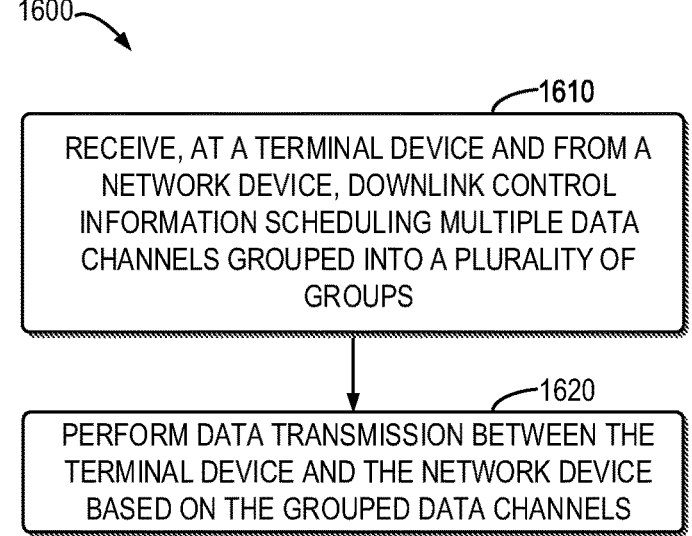
FIG. 16 illustrates an example method of communication implemented at a terminal device in accordance with some embodiments of the present disclosure.

FIG. 16 illustrates an example method 1600 of communication implemented at a terminal device in accordance with some embodiments of the present disclosure. For example, the method 1600 may be performed at the terminal device 110 as shown in FIG. 1. For the purpose of discussion, in the following, the method 1600 will be described with reference to FIG. 1. It is to be understood that the method 1600 may include additional blocks not shown and/or may omit some blocks as shown, and the scope of the present disclosure is not limited in this regard.

At block 1610, the terminal device 110 receives DCI from the network device 120, the DCI scheduling multiple data channels grouped into a plurality of groups. In some embodiments, the DCI may comprise a NDI field, one of bits in the NDI field corresponding to one group of data channels among the plurality of groups. In some embodiments, a MCS value may be shared among the plurality of groups. In some embodiments, a HARQ process may be shared among data channels in each group of the plurality of groups. In some alternative embodiments, data channels in each group among the plurality of groups may be associated with different HARQ processes. That is, a HARQ process may be not shared or shared among data channels in each group of the plurality of groups depending on signal qualities.

At block 1620, the terminal device 110 performs data transmission between the terminal device 110 and the network device 120 on the data channels based on the DCI. In some embodiments, the terminal device 110 may determine the number of data channels in each group of data channels among the plurality of groups, determine a group of data channels to which one of the bits corresponds based on the number of data channels; and perform the data transmission on the group of data channels based on the one of the bits.

In some embodiments, the terminal device 110 may determine the number of data channels based on the number of the bits in the NDI field and a total number of the scheduled data channels comprised in the DCI. In some embodiments, the terminal device 110 may determine the number of data channels by causing the difference in the number of data channels among the plurality of groups to be not larger than a first predetermined value. In some embodiments, the terminal device 110 may determine the number of data channels by causing the number of groups having the same number of data channels among the plurality of groups to be larger than a second predetermined value. In some embodiments, the terminal device 110 may determine the number of data channels based on a higher layer signaling parameter from the network device 120.

In this way, less bit is used to indicate new data or retransmission data for each data channel group. Thus, the payload of the DCI can be reduced and false detection rate can also be reduced.

FIG. 17 illustrates another example method 1700 of communication implemented at a terminal device in accordance with some embodiments of the present disclosure. For example, the method 1700 may be performed at the terminal device 110 as shown in FIG. 1. For the purpose of discussion, in the following, the method 1700 will be described with reference to FIG. 1. It is to be understood that the method 1700 may include additional blocks not shown and/or may omit some blocks as shown, and the scope of the present disclosure is not limited in this regard.

At block 1710, the terminal device 110 receives, from the network device 120, downlink data on multiple downlink data channels scheduled by a single downlink control channel. In other words, the multiple downlink data channels are scheduled by DCI in the single downlink control channel. In some embodiments, the terminal device 110 may receive, from the network device 120, the downlink data on at least one serving cell in at least one monitoring occasion for a downlink control channel.

At block 1720, the terminal device 110 transmits, to the network device 120, a HARQ feedback for the downlink data based on a counter DAI comprised in the DCI.

In some embodiments, the terminal device 110 may generate a HARQ codebook in order of the following: receptions on the multiple downlink data channels; indices of serving cells; and monitoring occasions for downlink control channels. In some embodiments, the number of downlink data channels scheduled by a single downlink control channel in a monitoring occasion for a downlink control channel is the same for each serving cell. In some embodiments, a time interval scheduled by a single downlink control channel in a monitoring occasion for a downlink control channel is the same for each serving cell.

In some embodiments, the terminal device 110 may determine the number of HARQ bits based on the maximum number of downlink data channels scheduled by a single downlink control channel among the serving cells in a monitoring occasion for a downlink control channel, and generate the HARQ codebook based on the number of HARQ bits. In some embodiments, the terminal device 110 may pad spare HARQ bits for a serving cell with a NACK feedback in accordance with a determination that the number of downlink data channels in the serving cell is smaller than the number of the HARQ bits in a monitoring occasion for a downlink control channel.

In some embodiments, the terminal device 110 may determine counter DAIs for the multiple downlink data channels by incrementing the counter DAI by one for each subsequent downlink data channel based on the order of receptions on the multiple downlink data channels, and generate a HARQ codebook based on the counter DAIs and the number of the multiple downlink data channels and a total DAI received from the single downlink control channel. In some embodiments, each of the counter DAI and the total DAI may have a bit length larger than two.

In some embodiments, the terminal device 110 may set the same counter DAI for each downlink data channel in the multiple downlink data channels, and generate a HARQ codebook based on the counter DAI and the number of the multiple downlink data channels comprised in the DCI. In some embodiments where a HARQ feedback window is associated with multiple groups of downlink data channels scheduled by multiple downlink control channels, if one of the multiple downlink control channels is missed, the terminal device 110 may generate a NACK feedback for one group among the multiple groups that is scheduled by the one of the multiple downlink control channels. Herein, each group of downlink data channels among the multiple groups is scheduled by a single downlink control channel.

In some embodiments where a HARQ feedback window is associated with multiple groups of downlink data channels scheduled by multiple downlink control channels, the terminal device 110 may determine the number of HARQ bits based on the maximum number of downlink data channels scheduled by a single downlink control channel in the HARQ feedback window, and generate the HARQ codebook based on the number of HARQ bits. Herein, each group of downlink data channels among the multiple groups is scheduled by a single downlink control channel. In some embodiments, if the number of downlink data channels in a serving cell is smaller than the number of the HARQ bits in a monitoring occasion for a downlink control channel, the terminal device 110 may pad spare HARQ bits for the serving cell with a NACK feedback.

In some embodiments, the terminal device 110 may determine counter DAIs for the multiple downlink data channels by incrementing the counter DAI by one for each subsequent downlink data channel based on the order of receptions on the multiple downlink data channels, and generate a HARQ codebook based on the counter DAIs and the number of the multiple downlink data channels comprised in the DCI. In some embodiments, the counter DAI may have a bit length larger than two.

In some embodiments where the multiple downlink data channels comprises multiple groups of downlink data channels, the terminal device 110 may generate one or two HARQ bits for each group among the multiple groups. In some embodiments, the terminal device 110 may obtain HARQ information bits by determining a HARQ information bit for each downlink data channel in one group of the multiple groups, and perform an AND operation on the HARQ information bits. Thereby, the HARQ bits for the HARQ feedback can be generated.

In this way, HARQ feedback enhancement can be achieved for the multiple downlink data channels scheduled by the DCI.

FIG. 18 illustrates an example method 1800 of communication implemented at a network device in accordance with some embodiments of the present disclosure. For example, the method 1800 may be performed at the network device 120 as shown in FIG. 1. For the purpose of discussion, in the following, the method 1800 will be described with reference to FIG. 1. It is to be understood that the method 1800 may include additional blocks not shown and/or may omit some blocks as shown, and the scope of the present disclosure is not limited in this regard.

As shown in FIG. 18, at block 1810, the network device 120 generates DCI scheduling multiple data channels grouped into a plurality of groups. In some embodiments, the DCI may comprise a NDI field, one of bits in the NDI field corresponding to one group of data channels among the plurality of groups. In some embodiments, a MCS value may be shared among the plurality of groups. In some embodiments, a HARQ process may be shared among data channels in each group of the plurality of groups. In some alternative embodiments, data channels in each group among the plurality of groups may be associated with different HARQ processes.

In some embodiments, the network device 120 may determine the number of data channels in each group among the plurality of groups, and generate the NDI field by assigning a bit for each group of data channels among the plurality of groups.

In some embodiments, the network device 120 may determine the number of data channels based on the number of the bits in the NDI field and a total number of the scheduled data channels comprised in the DCI. In some embodiments, the network device 120 may determine the number of data channels by causing the difference in the number of data channels among the plurality of groups to be not larger than a first predetermined value. In some embodiments, the network device 120 may determine the number of data channels by causing the number of groups having the same number of data channels among the plurality of groups to be larger than a second predetermined value.

In some embodiments, the network device 120 may transmit, to the terminal device 110, a higher layer signaling parameter indicating the number of data channels in each group among the plurality of groups.

At block 1820, the network device 120 transmits the DCI to the terminal device 110.

In this way, less bit is used to indicate new data or retransmission data for each data channel group. Thus, the payload of the DCI can be reduced and false detection rate can also be reduced.

Figure 19:
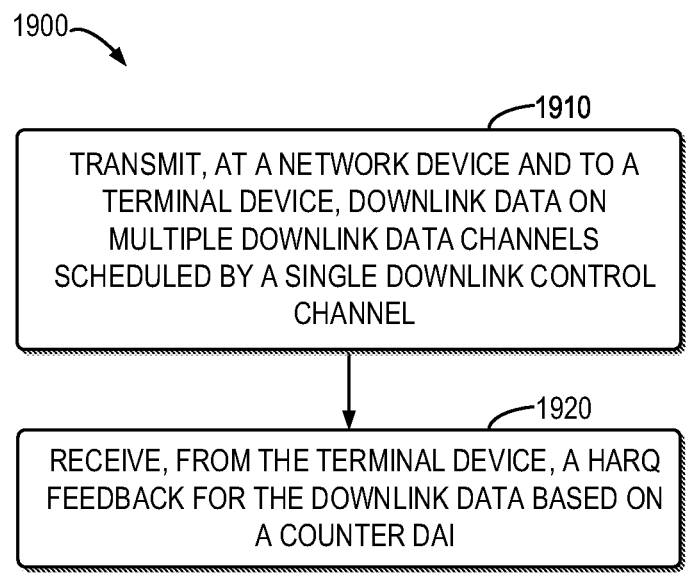
FIG. 19 illustrates another example method of communication implemented at a network device in accordance with some embodiments of the present disclosure.

FIG. 19 illustrates an example method 1900 of communication implemented at a network device in accordance with some embodiments of the present disclosure. For example, the method 1900 may be performed at the network device 120 as shown in FIG. 1. For the purpose of discussion, in the following, the method 1900 will be described with reference to FIG. 1. It is to be understood that the method 1900 may include additional blocks not shown and/or may omit some blocks as shown, and the scope of the present disclosure is not limited in this regard.

As shown in FIG. 19, at block 1910, the network device 120 transmits downlink data to the terminal device 110 on multiple downlink data channels scheduled by DCI transmitted on a single downlink control channel.

At block 1920, the network device 120 receives, from the terminal device 110, a HARQ feedback for the downlink data based on a counter DAI comprised in the DCI.

In some embodiments, the network device 120 may receive a HARQ codebook generated in order of the following: receptions on the multiple downlink data channels; indices of serving cells; and monitoring occasions for downlink control channels. In some embodiments, the number of downlink data channels scheduled by a single downlink control channel in a monitoring occasion for a downlink control channel may be the same for each serving cell. In some embodiments, a time interval scheduled by a single downlink control channel in a monitoring occasion for a downlink control channel may be the same for each serving cell.

In some embodiments, the network device 120 may receive HARQ bits, the number of the HARQ bits being the maximum number of downlink data channels scheduled by a single downlink control channels in a monitoring occasion for a downlink control channel. In some embodiments where the number of downlink data channels is smaller than the number of the HARQ bits, the network device 120 may receive spare HARQ bits padded with a NACK feedback.

In some embodiments, the network device 120 may receive a HARQ codebook generated based on counter DAIs and a total DAI and the number of downlink data channels received from the single downlink control channel, the counter DAIs being determined for the multiple downlink data channels by incrementing the counter DAI by one for each subsequent downlink data channel based on the order of receptions on the multiple downlink data channels. In some embodiments, each of the counter DAI and the total DAI has a bit length larger than two.

In some embodiments, the network device 120 may receive a HARQ codebook generated based on the counter DAI and the number of downlink data channels comprised in the DCI, the same counter DAI being set for downlink data channels in the multiple downlink data channels. In some embodiments where a HARQ feedback window is associated with multiple groups of downlink data channels scheduled by multiple downlink control channels, the network device 120 may receive a NACK feedback for one group among the multiple groups that is scheduled by one of the multiple downlink control channels in accordance with a determination that the one of the multiple downlink control channels is missed.

In some embodiments where a HARQ feedback window is associated with multiple groups of downlink data channels scheduled by multiple downlink control channels, the network device 120 may receive HARQ bits, the number of the HARQ bits being the maximum number of downlink data channels scheduled by a single downlink control channel in the. In some embodiments, the network device 120 may receive spare HARQ bits padded with a NACK feedback in accordance with a determination that the number of downlink data channels is smaller than the number of the HARQ bits.

In some embodiments, the network device 120 may receive a HARQ codebook generated based on counter DAIs and the number of the multiple downlink data channels comprised in the DCI, the counter DAIs being determined for the multiple downlink data channels by incrementing the counter DAI by one for each subsequent downlink data channel based on the order of receptions on the multiple downlink data channels. In some embodiments, the counter DAI has a bit length larger than two.

In some embodiments where the multiple downlink data channels comprises multiple groups of downlink data channels, the network device 120 may receive one or two HARQ bits generated for each group among the multiple groups. In some embodiments, the network device 120 may receive the one or two HARQ bits generated by performing an AND operation on HARQ information bits for downlink data channels in one group of the multiple groups.

In this way, HARQ feedback enhancement can be achieved for the multiple downlink data channels scheduled by the DCI.

Example Implementation of Device

Figure 20:
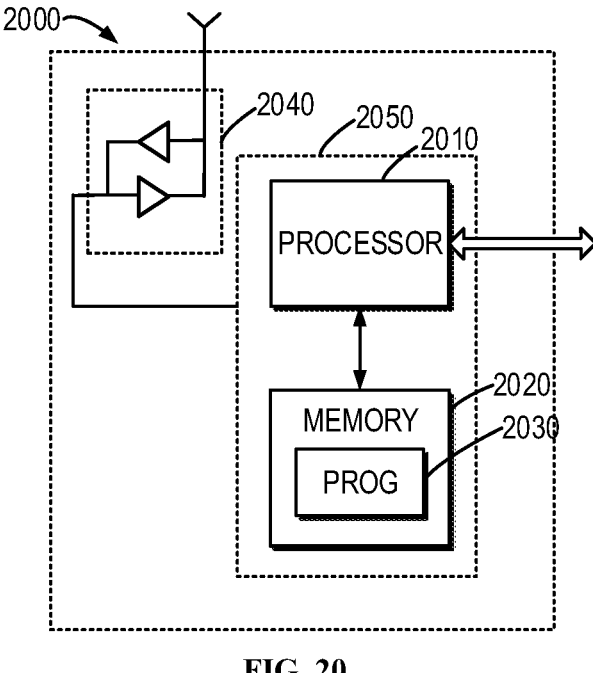
FIG. 20 is a simplified block diagram of a device that is suitable for implementing embodiments of the present disclosure.

FIG. 20 is a simplified block diagram of a device 2000 that is suitable for implementing embodiments of the present disclosure. The device 2000 can be considered as a further example implementation of the terminal device 110 or the network device 120 as shown in FIG. 1. Accordingly, the device 2000 can be implemented at or as at least a part of the terminal device 110 or the network device 120.

As shown, the device 2000 includes a processor 2010, a memory 2020 coupled to the processor 2010, a suitable transmitter (TX) and receiver (RX) 2040 coupled to the processor 2010, and a communication interface coupled to the TX/RX 2040. The memory 2010 stores at least a part of a program 2030. The TX/RX 2040 is for bidirectional communications. The TX/RX 2040 has at least one antenna to facilitate communication, though in practice an Access Node mentioned in this application may have several ones. The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 2030 is assumed to include program instructions that, when executed by the associated processor 2010, enable the device 2000 to operate in accordance with the embodiments of the present disclosure, as discussed herein with reference to FIGS. 4 to 19. The embodiments herein may be implemented by computer software executable by the processor 2010 of the device 2000, or by hardware, or by a combination of software and hardware. The processor 2010 may be configured to implement various embodiments of the present disclosure. Furthermore, a combination of the processor 2010 and memory 2020 may form processing means 2050 adapted to implement various embodiments of the present disclosure.

The memory 2020 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 2020 is shown in the device 2000, there may be several physically distinct memory modules in the device 2000. The processor 2010 may be of any type suitable to the local technical network, and may include one or more of general purpose computers, special purpose computers, microprocessors, digital signal processors (DSPs) and processors based on multicore processor architecture, as non-limiting examples. The device 2000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 4 to 19. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A user equipment (UE) comprising:
a receiver configured to receive, from a base station, single downlink control information (DCI) for scheduling multiple Physical Downlink Shared Channel (PDSCH), the single DCI including first information associated with a value of each of multiple PDSCH, wherein the receiver is configured to receive, from the base station, second information associated with a number of groups;
a processor configured to divide the multiple PDSCHs, scheduled by the single DCI, into the groups based on the first information and the second information; and
a transmitter configured to generate Hybrid Automatic Repeat Request (HARQ) information for each of the groups,
wherein:
the transmitter is further configured to:
generate an acknowledgement (ACK) for a HARQ information bit of a group of the groups if the receiver correctly receives all PDSCH(s) of the group, and
generate a non-acknowledgement (NACK) for the HARQ information bit of the group if the receiver incorrectly receives at least one PDSCH of the group.

2. The UE according to claim 1, wherein
the value is a Start and Length Indicator Value (SLIV), and
the number of the multiple PDSCH, scheduled by the single DCI, is signaled by the number of the indicated SLIV in the first information included in the single DCI.

3. The UE according to claim 1, wherein
the processor is configured to divide the groups into a first group and a second group, and
determine the number of PDSCHs included in each of the groups based on the following formulas:

$$M_1 = \mathrm{mod}\ (C, M) \tag{1}$$

$$M_2 = M - M1 \tag{2}$$

$$K_1 = \left\lceil \frac{C}{M} \right\rceil \tag{3}$$

$$K_2 = \left\lfloor \frac{C}{M} \right\rfloor, \tag{4}$$

if $M_1$ is more than 0,

C is given by the first information,

M is given by the second information, $M_1$ corresponds to the number of the groups in the first type, $M_2$ corresponds to the number of the groups in the second type, $K_1$ corresponds to the number of PDSCHs included in each of the groups in the first type, $K_2$ corresponds to the number of PDSCHs included in each of the groups in the second type.

4. A method for a user equipment (UE), the method comprising:

receiving, from a base station, single downlink control information (DCI) for scheduling multiple Physical Downlink Shared Channel (PDSCH), the single DCI including first information associated with a value of each of multiple PDSCH;

receiving, from the base station, second information associated with a number of groups;

dividing the multiple PDSCHs, scheduled by the single DCI, into the groups based on the first information and the second information; and generating Hybrid Automatic Repeat Request (HARQ) information for each of the groups, wherein the generating the HARQ information for each of the groups comprises:

generating an acknowledgement (ACK) for a HARQ information bit of a group of the groups if the receiver correctly receives all PDSCH(s) of the group, and generating a non-acknowledgement (NACK) for the HARQ information bit of the group if the receiver incorrectly receives at least one PDSCH of the group.

5. The method according to claim 4, wherein the value is a Start and Length Indicator Value (SLIV), and the number of the multiple PDSCH, scheduled by the single DCI, is signaled by the number of the indicated SLIV in the first information included in the single DCI.

6. The method according to claim 4, wherein the dividing comprises:

dividing the groups into a first group and a second group, and determining the number of PDSCHs included in each of the groups based on the following formulas:

$$M_1 = \mathrm{mod}\ (C, M) \tag{1}$$

$$M_2 = M - M1 \tag{2}$$

$$K_1 = \left\lceil \frac{C}{M} \right\rceil \tag{3}$$

$$K_2 = \left\lfloor \frac{C}{M} \right\rfloor, \tag{4}$$

if $M_1$ is more than 0,

C is given by the first information,

M is given by the second information, $M_1$ corresponds to the number of the groups in the first type, $M_2$ corresponds to the number of the groups in the second type, $K_1$ corresponds to the number of PDSCHs included in each of the groups in the first type, $K_2$ corresponds to the number of PDSCHs included in each of the groups in the second type.

\* \* \* \* \*